US012182186B2

(12) United States Patent
Hoffmann et al.

(10) Patent No.: US 12,182,186 B2
(45) Date of Patent: *Dec. 31, 2024

(54) SYSTEMS AND METHOD FOR GENERATING A STRUCTURED REPORT FROM UNSTRUCTURED DATA

(71) Applicant: Thomson Reuters Enterprise Centre GmbH, Zug (CH)

(72) Inventors: Hella-Franziska Hoffmann, London (GB); Johannes Schleith, London (GB); Juan Dario Lara Moreno, London (GB)

(73) Assignee: Thomson Reuters Enterprise Centre GmbH, Zug (CH)

( * ) Notice: Subject to any disclaimer, the term of this patent is extended or adjusted under 35 U.S.C. 154(b) by 461 days.

This patent is subject to a terminal disclaimer.

(21) Appl. No.: 17/233,249

(22) Filed: Apr. 16, 2021

(65) Prior Publication Data

US 2021/0232615 A1  Jul. 29, 2021

Related U.S. Application Data

(63) Continuation-in-part of application No. 16/269,325, filed on Feb. 6, 2019, now Pat. No. 11,550,810.

(Continued)

(51) Int. Cl.
 *G06F 16/31* (2019.01)
 *G06F 16/33* (2019.01)
(Continued)

(52) U.S. Cl.
 CPC ........ *G06F 16/3334* (2019.01); *G06F 16/313* (2019.01); *G06F 16/3335* (2019.01); *G06F 16/335* (2019.01); *G06F 16/338* (2019.01)

(58) Field of Classification Search
 USPC ......... 707/602, 603, 796, 804, 811, 999.102, 707/999.103
 See application file for complete search history.

(56) References Cited

U.S. PATENT DOCUMENTS 10,510,026 B1 * 12/2019 Adamson ................ G06F 16/33
2004/0163043 A1    8/2004 Baudin et al.
(Continued)

FOREIGN PATENT DOCUMENTS

EP  3005148 A1  4/2016
EP  3724790 A1  10/2020

OTHER PUBLICATIONS

International Search Report and Written Opinion issued for PCT Application No. PCT/IB2019/050962, dated May 24, 2019, 13 pages.

(Continued)

*Primary Examiner* — Son T Hoang
(74) *Attorney, Agent, or Firm* — Norton Rose Fulbright US LLP

(57) ABSTRACT

Methods and systems for providing computer-assisted guided review of unstructured data to generate a structured data output based on customizable template rules. In embodiments, an unstructured file is received, and a predefined template is selected. The predefined template includes a plurality of fields, each field corresponding to a field of the structured report. The predefined template also defines extraction rules for each field of the predefined template, and the extraction rules define parameters for identifying unstructured data relevant to the associated field. The extraction rules are applied to the unstructured file to identify data relevant to the field associated with the corresponding extraction rule, and the data identified as relevant is confirmed. Confirming the relevant data includes deter- (Continued)

mining to refine the relevant data based on a condition, and modifying the extraction rule associated with the field to refine the relevant data.

17 Claims, 16 Drawing Sheets

Related U.S. Application Data

(60) Provisional application No. 62/626,829, filed on Feb. 6, 2018.

(51) Int. Cl.
*G06F 16/335* (2019.01)
*G06F 16/338* (2019.01)

(56) References Cited

U.S. PATENT DOCUMENTS

| | | | |
|---|---|---|---|
| 2009/0112892 A1* | 4/2009 | Cardie | G06F 16/93 |
| 2009/0119268 A1 | 5/2009 | Bandaru et al. | |
| 2009/0216746 A1* | 8/2009 | Aubin | G06F 16/254 |
| | | | 707/999.005 |
| 2009/0254971 A1* | 10/2009 | Herz | G06F 16/337 |
| | | | 726/1 |
| 2011/0093481 A1* | 4/2011 | Hussam | G06F 16/20 |
| | | | 707/756 |
| 2011/0295854 A1* | 12/2011 | Chiticariu | G06F 16/313 |
| | | | 707/765 |
| 2015/0039651 A1 | 2/2015 | Kinsely et al. | |
| 2015/0309990 A1 | 10/2015 | Allen et al. | |
| 2015/0358292 A1* | 12/2015 | Karale | G06F 16/335 |
| 2017/0091780 A1* | 3/2017 | Kannan | G06F 16/3331 |
| 2018/0024982 A1 | 1/2018 | Fan et al. | |
| 2018/0232359 A1* | 8/2018 | Crudele | G06F 16/338 |
| 2018/0267947 A1* | 9/2018 | Miller | G06F 16/2477 |
| 2019/0114693 A1* | 4/2019 | Zhang | G06F 16/24575 |

OTHER PUBLICATIONS

Patent Cooperation Treaty, International Search Report and Written Opinion issued for PCT Application No. PCT/IB2022/053218, dated Jul. 5, 2022, 10 pages.

* cited by examiner

GENERAL

| | | | |
|---|---|---|---|
| Case Reference: | PI-LSCC-1116-JST1 | Status: | Investigating Liability |
| Disease Type: | NIHL | Date Response Due: | 20.02.2017 |
| Handler: | Sara K. Smith | Supervisor: | |
| Comments: | | | |

PARTY DETAILS  251

| | | | |
|---|---|---|---|
| Claimant's Name: | John Smith | Insured: | Ledshire City Council |
| Claimant's Date of Birth: | 05.10.1955 | Insurer: | Kelto Insurance |
| Claimant's Address: | 1 Chapel Hill, Heswall, LEDSHIRE, LS1 1AA | | |
| | 252 | | |
| Claimant's Solicitor: | Taylor and Jones Solicitors | | |

COVERAGE APPORTIONMENT STATUS

| | |
|---|---|
| Exposure Period: | 1980 to 1989 |
| Policy Cover: | MMI - 01/12/1979 to 31/03/1989 |
| Status: | ☐ Confirmed   ☐ Confirmed subject to proof of employment   ☐ Under investigation |
| Co-Insurers: | N/A |
| Co-Defendants: | Claim sent to J & J Construction represented by Williams and Brown Solicitors. Possibly other noisy employers. Requested further details from claimant. |
| Special Handling Instructions | ☐ Yes   ☑ No |
| Apportionment agreed by all Parties? | ☐ Yes   ☑ No |
| Case Status | ☑ Handling   ☐ Coordinating   ☐ Follow |

LIABILITY  253

| | |
|---|---|
| Liability Status | ☑ Under Investigation   ☐ No admissions   ☐ Admitted   ☐ Denied |
| Liability Comments *eg nature of the job Claimant undertook/documentary evidence* | Documents and Surveys/Company Information: To be confirmed<br><br>Claimant's Job/Role/ Employment:<br>• Claimant was employed by defendant as a concrete labourer at the Lake Woods Depot in Heswall.<br>• Alleged exposure to concrete mixers, dozers, generators and hammer drills.<br>• Alleged exposure from nearby equipment.<br>• Working hours: 40 hours a week, 8 hours per day from Monday to Friday. Machinery operated at least 4½ hours a day.<br>• Never provided with ear protection during his employment.<br>• Never given any noise awareness training.<br>• no noisy hobbies<br><br>Handlers Assessment/ Liability Conclusion: Requested further information regarding the work environment and time using each tool etc.<br><br>☑ Likely exposed   ☐ Unlikely exposed   ☐ Borderline |

| case_id | document_id | my_doc_type | sentence_id | sentence | date_tags |
|---|---|---|---|---|---|
| 0 | 3 | LOX | 1 | Reavers & Thomson Barristers     Contact: Rachel Zane | |
| 0 | 3 | LOX | 2 | T: +44 1234 567 890 | |
| 0 | 3 | LOX | 3 | C: | |
| 0 | 3 | LOX | 4 | r.zane@jsolicitors.co.uk | |
| 0 | 3 | LOX | 5 | | |
| 0 | 3 | LOX | 6 | Our ref:    JS/CJ116/PX Your ref: not known | |
| 0 | 3 | LOX | 7 | 20 November 2018 | 20 November 2018 |
| 0 | 3 | LOX | 8 | Dear Sir | |
| 0 | 3 | LOX | 9 | John Smith vs Ladshire City Council and others | |
| 0 | 3 | LOX | 10 | Our client:    John Smith | |
| 0 | 3 | LOX | 11 | Address:    1 Chapel Hill, Heswall, LEDSHIRE, L51 1AA | |
| 0 | 3 | LOX | 12 | DOB: 05 October 1955 | 05 October 1955 |
| 0 | 3 | LOX | 13 | NI: QQ 123456 C | |
| 0 | 3 | LOX | 14 | Exposure period: 1980-1989 | |
| 0 | 3 | LOX | 15 | We are instructed by the above-named client to claim damages in connection with noise induced hearing loss and/or tinnitus as a result of their employment with your insured. | |
| 0 | 3 | LOX | 16 | We are writing this letter in accordance with the Pre Action Protocol for Disease and Illness Claims. | |
| 0 | 3 | LOX | 17 | Please note that as much information as possible is provided, whether herein or in the enclosures. | |

SYSTEMS AND METHOD FOR GENERATING A STRUCTURED REPORT FROM UNSTRUCTURED DATA

CROSS-REFERENCE TO RELATED APPLICATIONS

The present application is a continuation-in-part of U.S. patent application Ser. No. 16/269,325 filed Feb. 6, 2019 and entitled, "SYSTEMS AND METHOD FOR GENERATING A STRUCTURED REPORT FROM UNSTRUCTURED DATA," which claims priority from U.S. Provisional Application No. 62/626,829, filed Feb. 6, 2018 and entitled, "CLAIMS ASSESSMENT," the disclosures of which are incorporated by reference herein in their entirety.

TECHNICAL FIELD

The present subject matter is directed generally to data extraction, and more particularly to unstructured data analysis to generate a structured data output based on customizable template rules.

BACKGROUND

Given the large amounts of data related to any facet of life, it is no wonder that any manual review of even relatively small amounts of documents can prove to be time consuming, tedious, and expensive. This is the case for any manual review process implemented with respect to, e.g., claim processing. In these cases, claim processing can involve large amounts of documents that need to be reviewed to find, identify, and extract data that is relevant to a particular case, such as client and involved parties information, and factual evidence. Complicating the process is the fact that most documents that need to be reviewed are not structured documents, in the sense that the documents include natural language expressions rather than structured language fields. Claim processors thus must parse through the large amounts of volumes looking for relevant information, which may lead to missed information, and, in the best of cases, may be a very expensive process.

Some solutions have been proposed to address the challenges with manual document review, most involving computer-assisted review. In one particular solution, a system provides functionality to recognize and extract all specific items, such as entities, dates, etc. However, this solution offers no semantic context to the extracted data. As such, a user must still parse through the extracted items, without context, to identify desired data. Thus, this solution offers marginal improvements.

Another solution that has been proposed involves more sophisticated data extraction methods, such as using business rules or machine learning algorithms. However, in some cases, the rules and algorithms may be hardcoded and non-transparent. These extraction algorithms are essentially a black box that does not provide transparency into the extraction process or allow a user to make dynamic modifications. Thus, these solutions are inflexible.

SUMMARY

The present application relates to systems and methods for providing computer-assisted guided review of unstructured data to generate a structured data output based on customizable template rules. In one particular embodiment, a method of generating a structured report from unstructured data may be provided. The method may include receiving at least one input file containing the unstructured data, and selecting a predefined template. The predefined template may include a plurality of fields, each field corresponding to a field of the structured report. The predefined template may define at least one extraction rule for one or more fields in the plurality of fields of the predefined template. The at least one extraction rule may define parameters for identifying data in the unstructured data of the at least one input file that is relevant to the corresponding field of the predefined template. The method may also include applying the at least one extraction rule to the at least one input file to identify the data that is relevant to the field associated with the corresponding at least one extraction rule. The method may further include confirming the data identified as relevant. Confirming the data identified as relevant may include determining to refine the data identified as relevant to the field associated with the corresponding at least one extraction rule based on at least one condition of the data identified as relevant, and modifying, in response to the determining, the at least one extraction rule associated with the field to refine the data identified as relevant to the field.

In another embodiment, a system for generating a structured report from unstructured data may be provided. The system may include at least one unstructured document source, and a server. The server may be configured to receive at least one unstructured document and a user input to select a predefined template. The predefined template may include a plurality of fields, each field corresponding to a field of the structured report. The predefined template may define at least one extraction rule for one or more fields in the plurality of fields of the predefined template, and the at least one extraction rule may define parameters for identifying data in the unstructured data of the at least one unstructured document that is relevant to the corresponding field of the predefined template. The server may also be configured to apply the at least one extraction rule to the at least one unstructured document to identify the data that is relevant to the field associated with the corresponding at least one extraction rule. The server may be further configured to confirm the data identified as relevant. Confirming data identified as relevant may include determining to refine the data identified as relevant to the field associated with the corresponding at least one extraction rule based on at least one condition of the data identified as relevant, and modifying, in response to the determining, the at least one extraction rule associated with the field to refine the data identified as relevant to the field.

In yet another embodiment, a computer-based tool for generating a structured report from unstructured data may be provided. The computer-based tool may include non-transitory computer readable media having stored thereon computer code which, when executed by a processor, causes a computing device to perform operations that may include selecting a predefined template. The predefined template may include a plurality of fields, each field corresponding to a field of the structured report. The predefined template may define at least one extraction rule for one or more fields in the plurality of fields of the predefined template, and the at least one extraction rule may define parameters for identifying data in at least one unstructured document that is relevant to the corresponding field of the predefined template. The operations may also include displaying data identified as relevant to the one or more fields of the plurality of fields. The data identified as relevant to the one or more fields may be identified based on an application of the at least one extraction rule associated with a corresponding field to the at least one unstructured document. The operations may further include confirming the data identified as relevant. Confirming the data identified as relevant may include determining to refine the data identified as relevant to the field associated with the corresponding at least one extraction rule based on at least one condition of the data identified as relevant, and causing modification, in response to the determining, of the at least one extraction rule associated with the field to refine the data identified as relevant to the field.

The foregoing broadly outlines the various aspects and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 2A shows an example view of a structured report in accordance with embodiments of the present disclosure;

FIG. 2B shows an example view of a subsentence item identification and tagging in accordance with embodiments of the present disclosure;

FIG. 2C shows an example of a sentence level index in accordance with embodiments of the present disclosure;

FIG. 2E shows an example of an extraction of relevant statements within the unstructured input files in accordance with embodiments of the present disclosure;

FIG. 4D shows another example view of a GUI configured in accordance with embodiments of the present disclosure;

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1:
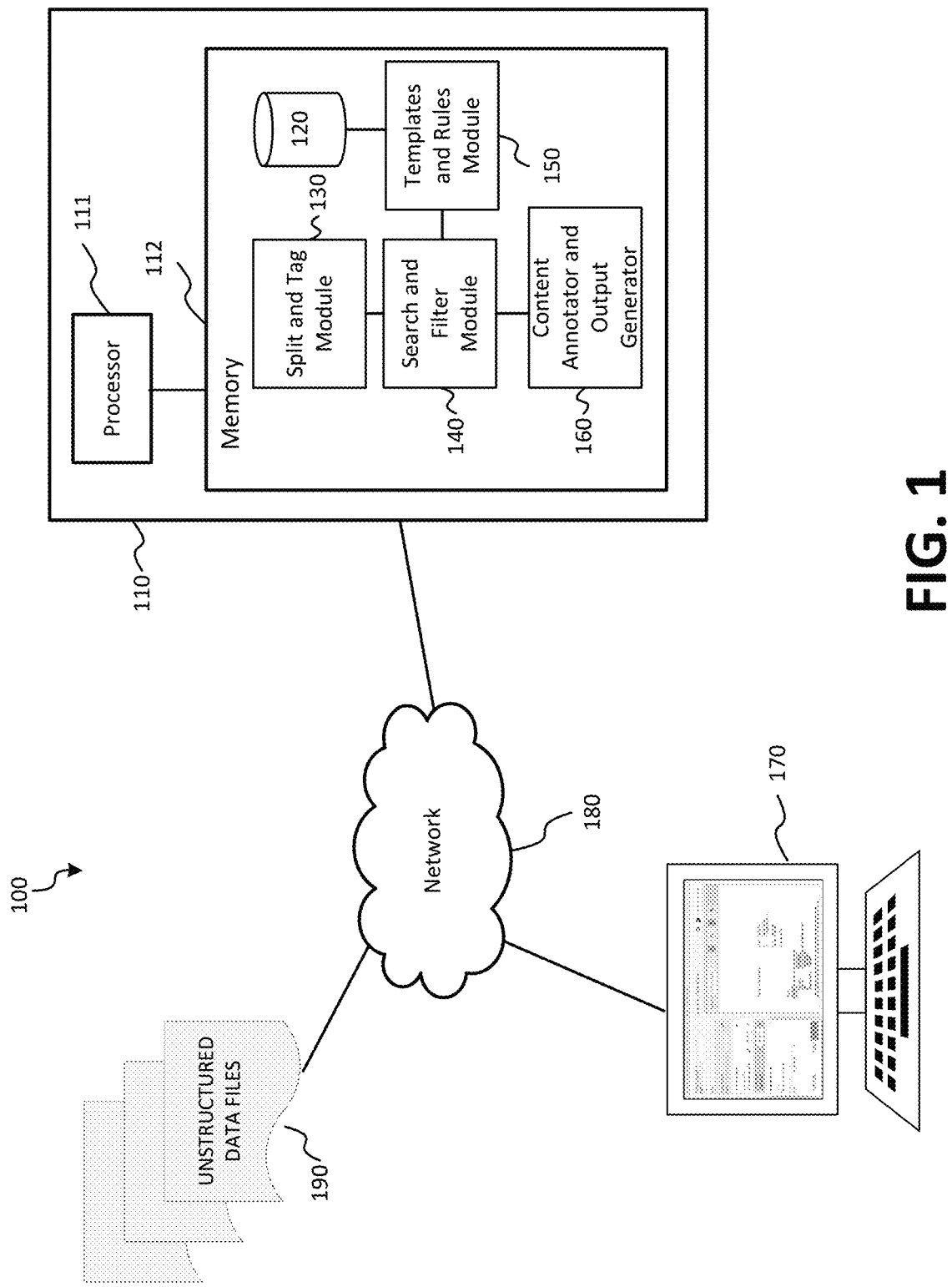
FIG. 1 shows a block diagram of an exemplary system configured to perform operations in accordance with embodiments of the present disclosure.

FIG. 1 is a block diagram of an exemplary system 100 configured with capabilities and functionality for providing computer-assisted guided review of unstructured data to generate a structured data output based on customizable template rules in accordance with embodiments of the present disclosure. As shown in FIG. 1, system 100 includes server 110 and at least one user terminal 170 communicatively coupled with server 110. These components, and their individual components, may cooperatively operate to provide functionality in accordance with the discussion herein. For example, in operation according to embodiments, unstructured data files 190 may be provided as input to server 110. The various components of server 110 may cooperatively operate to process the content of the unstructured data files 190 based on predefined templates, to apply content extraction algorithms to unstructured data files 190 in order to identify and extract unstructured information relevant to the various sections of the predefined templates based on extraction rules associated with the various sections of the predefined templates. In embodiments, the extraction rules of the predefined templates may be dynamically modifiable by users during operations. The extracted information may be used to generate a structured output report.

It is noted that the functional blocks, and components thereof, of system 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

Unstructured data files 190 may comprise at least one document including unstructured data. Unstructured data may refer to information expressed in natural language, may include information structured differently than the desired output report (e.g., as indicated by a predefined template), and may include information structured differently in different files of unstructured data files 190. Unstructured data files 190 may include files having various formats (e.g., pdf, txt, doc, etc.). In one particular example, content of data files of unstructured data files 190 may include information related to claims, such as personal injury claims, insurance claims, etc. Information related to particular aspects of a claim may be spread over a particular document, or documents, in the unstructured data files 190. For example, information related to a period of employment of a particular person may be included in different sections of a document, or documents. Similarly, a date of birth of a person may be in some section of some document, or documents. From this, it will be appreciated that identifying and extracting such information from unstructured data files 190 manually may be difficult, long, and tedious. Even using existing automated systems, which may extract all dates, a user may have to go through all dates to manually filter the correct desired date. As will be further appreciated, aspects of the present disclosure provide a mechanism to alleviate and obviate the deficiencies of existing systems.

User terminal 170 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 170 may be configured to provide a GUI structured to facilitate input and output operations in accordance with aspects of the present disclosure. Input output operations may include operations for selecting data files from unstructured data files 190 for input to server 110, selecting a predefined template to apply to the selected files to identify relevant content based on the extraction rules in the selected predefined template, validating the identified relevant content, modifying the extraction rules to refine the extraction process, and selecting relevant content to include in the output report. These functions are described in more detail below. In some embodiments, users may create the predefined templates. Creating the predefined templates may include creating and/or specifying extraction rules to be included in the predefined templates. Aspects for creation of predefined templates and extraction rules are described in more detail below.

It is noted that, in some embodiments, system 100 may be configured with different levels of users. For example, users may be assigned an admin level or a user level. Admin level may be higher than user level, and may include more and/or higher privileges than user level. For example, an admin may be allowed to make configuration changes and to specify an outlay of the GUI. In addition, the admin may be allowed to create predefined templates, while a user may be allowed to select predefined templates but not create them. In embodiments, an admin may also be allowed to create extraction rules and assign them to particular sections of the predefined template, while a user may be allowed to modify the extraction rules but not reassign them from the particular sections to which the extraction rules are assigned.

Server 110, user terminal 170, and unstructured data files 190 may be communicatively coupled via network 180. Network 180 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between server 110, user terminal 170, and unstructured data files 190.

Server 110 may be configured to receive as an input at least one unstructured data file in unstructured data files 190, to provide extraction of relevant content from the data files based on a predefined template and dynamically modifiable extraction rules, to facilitate modification of the dynamically modifiable extraction rules by a user, and to provide a structured output report based on the extracted relevant content. This functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. Furthermore, those of skill in the art would recognize that although FIG. 1 illustrates components of server 110 as single and separate blocks, each of the various components of server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

As shown in FIG. 1, server 110 includes processor 111, memory 112, database 120, split and tag module 130, search and filter module 140, templates and rules module 150, and content annotator and output generator 160. Processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, as noted above, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

Memory 112 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 112 may comprise a processor readable medium configured to store one or more instruction sets (e.g., software, firmware, etc.) which, when executed by a processor (e.g., one or more processors of processor 111), perform tasks and functions as described herein.

Memory 112 may also be configured to facilitate storage operations. For example, memory 112 may comprise database 120 for storing user profile information (e.g., privilege levels, preference data, statistical data, etc.), predefined templates, extraction rules, etc., which system 100 may use to provide the features discussed herein. Database 120 is illustrated as integrated into memory 112, but may be provided as a separate storage module. Additionally or alternatively, database 120 may be a single database, or may be a distributed database implemented over a plurality of database modules.

Templates and rules module 150 may be configured to facilitate creation and configuration of predefined templates and extraction rules to be defined and included in the predefined templates. In some embodiments, a user with administrative privileges may use terminal 170 to create and configure, using the GUI, a predefined template using the functionalities of templates and rules module 150. A predefined template may include various fields and sections that correspond to field and sections of a structured output report. In that sense, a predefined template may be viewed as defining the structured output report. Templates and rules module 150 may also include functionality to allow the user to specify, for the various fields and sections, the information required to be included in those fields and sections of the template (and consequently in the structured output report). For example, a user may specify a name of "date of claim" for a particular field, and may specify that for the "date of claim" field, a date should be entered. Additionally, the user may also specify extraction rules that may be applied to the unstructured input files to obtain the "date of claim" date. These extraction rules will be discussed in more detail below. The same may be done for each field and section of the predefined template. The results may be, after operations in accordance with aspects of the present disclosure, a template in which each field includes relevant information extracted from the unstructured input files based on a corresponding extraction rule for the various fields of the template. It is noted that different templates may be created for different use cases and for different structured output reports. The extracted information may be then be used to generate a corresponding structured output report. FIG. 2A illustrates an example of a structured output report 250.

A structured output report may be designed to provide a quick reference view of information contained in one or more documents for an end user reviewing a work file. As shown in FIG. 2A, structured output report 250 may include various fields and sections. For example, structured output report 250 may include field 251 to indicate the claimant's name and field 252 to indicate the claimant's date of birth. In this case, a predefined template (not shown) corresponding to structured output report 250 may be created to similarly include fields to indicate the claimant's name and date of birth. For the claimant's name field in the predefined template, a user may specify that a "named entity" should be included. For the claimant's date of birth field in the predefined template, a user may specify that a "date" should be included. Furthermore, the user may create, select, and/or define extraction rules for obtaining the relevant information from the unstructured input files. For example, for the claimant's date of birth field in the predefined template, a user may specify an extraction rule that searches for a date and inputs into the date of birth field. It is again noted that extraction rules are discussed in more detail below.

Structured output report 250 may also include section 253 for including liability comments. In this case, a user may specify that this section may include statements. An extraction rule may be specified for section 253 that facilitates collection of any statement within the unstructured input files related to liability. As will be further explained below, this may include identifying and tagging sentences within the unstructured input files, and applying filters that identify sentences relevant to liability, such as by using keywords, semantic expressions, entities within the context of a keyword, etc.

Templates and rules module 150 may also be configured to facilitate modification of the extraction rules by a user during operations. In aspects, a user may edit the extraction rules to further refine the extraction of relevant content from the unstructured input files. For example, a predefined template field may require a claimant's date of birth. An extraction rule associated with this predefined template field may search for dates and extract all of the dates as potential matches to the date of birth. In this case, during operation, a user may modify the extraction rule to include a filter that extracts a date that is proximate to a keyword "DOB." As a results, the potential matches are further refined based on the modification, which results in more accurate results being provided to the user. This functionality of templates and rules module 150 will be discussed in more detail below. In some aspects, template and rules module 150 may also include functionality to automatically refine the extraction rules based on a user selection. For example, where an extraction rule returns multiple matches, a user selecting one of the matches may cause templates and rules module 150 to refine the extraction rules to account for the user selection.

With reference back to FIG. 1, split and tag module 130 may be configured to receive unstructured data and/or data files from unstructured data files 190 as input, to split the unstructured input file into sentences, to identify subsentence items, and to index the unstructured input file, the sentences, and the subsentence items in the unstructured data file. In aspects, the functionality of split and tag module 130 to split the unstructured input file may implemented using a text conversion approach. In a text conversion approach, the unstructured input file may be processed to obtain a raw text version of the unstructured input file. The text conversion may be accomplished using various commonly available tools, and/or customized tools. For example, the PDFMiner python package may be used to obtain a raw text version of the unstructured input file. The raw text version of the unstructured input file may then be processed to split the raw text into sentences. In aspects, natural language processing (NLP) algorithms may be applied to the raw text to split the raw text into sentences. The NLP algorithms may obtained using various commonly available tools, and/or customized tools. For example, the NLTK python package may be used to split the raw text into sentences. The results of this text conversion approach may be a textual representation of the unstructured input file split into individual sentences.

In another aspect, a Hypertext Markup Language (HTML) conversion approach may be used. In an HTML approach, the unstructured input file may be processed to obtain an HTML version of the unstructured input file. The HTML conversion may be accomplished using various commonly available tools, and/or customized tools. For example, the PDFMiner python package may be used to obtain an HTML version of the unstructured input file. The HTML version of the file respects line breaks, and also includes HTML tags that specify different sections of the unstructured input file (e.g., header, body, title, paragraphs, etc.). The HTML tags of the HTML version of the unstructured input file may be used to break up the unstructured input file into chunks, where each chunk may correspond to different sections of the unstructured input file. It will be appreciated that the chunks may be more manageable than the entire unstructured input file. As such, each chunk may then be processed to split the chunk into sentences. For example, NLP algorithms may be applied to the chunks to split the chunks into sentences. The NLP algorithms may obtained using various commonly available tools, and/or customized tools. For example, the NLTK python package may be used to split the chunks into sentences. The results of this approach is a textual representation of each section of the unstructured input file split into individual sentences.

It is noted that the text conversion approach works well for floating text, such as the body of an email. In some cases, the text conversion approach may extract subsentence levels, such as content from columns, headers, lists, and other structural content in a random order or as one big sentence. However, in this situation, the HTML conversion approach may work well, as it involves using structural components captured in HTML to break up content into chunks and allows extracting subsentence level items, such as contact information and bullet point items, etc., to be done more easily. As such, embodiments of the present disclosure may use a combined approach to split the unstructured input files into sentences, in which a combination of the text conversion and HTML conversion approaches may be used. It is also noted that the resulting individual sentences may or may not be semantically coherent. For example, a particular sentence may be a sentence such as "Please note that as much information as possible is provided, whether herein or in the enclosures." As will be appreciated, this sentence is semantically coherent. Other particular sentences, however, may not be semantically coherent. For example, a sentence another sentence resulting from the splitting operations may be "someone@email.com," which may not be semantically coherent by itself. This is because the splitting operations of split and tag module 130 split the unstructured input file into the sentences, while further operations of system 100, as discussed below, identify sentences which are statements, and those which are actually subsentence elements (e.g., dates, entities, times, values, special designations, identifications, email addresses, telephone numbers, etc.).

In some embodiments, prior to the splitting of the unstructured input files, the files may be processed to digitize the content within the files. For example, the unstructured input files in unstructured data files 190 may be scanned files, image files, and or other type of non-searchable files. In this case, the unstructured input files may be OCR'd (optical character recognition). In embodiments, the unstructured input files are further processed to refine white space and character recognition, to handle tables, tick boxes, line breaks, columns, and other structural elements, and to identify and integrate special symbols and images. This further functionality may be implemented using machine learning algorithms.

Split and tag module 130 may be configured to, subsequent to splitting the unstructured input files into sentences, identify and tag subsentence items. In aspects, identifying and tagging subsentence items may be accomplished using NLP algorithms. Subsentence items may include items that are not necessarily a sentence, and may include items such as dates, entities, times, values, special designations, identifications, email addresses, telephone numbers, etc. In some embodiments, identifying and tagging subsentence items may include performing named entity recognition and date tagging. Named entity recognition may include applying NLP algorithms to identify entities (e.g., organizations, facilities, groups, companies, countries, governments, persons, places, products, etc.). Named entity recognition may be accomplished using various commonly available tools, and/or customized tools. For example, OpenCalais may be used to identify and tag subsentence items as entities. In some embodiments, named entity recognition may also provide a positive identification of the entity. Date tagging may include identifying, normalizing, and extracting dates, times, and/or periods from the unstructured input file. Date tagging may be accomplished using various commonly available tools, and/or customized tools. For example, Stanford NLP's SUTime library may be used to identify, normalize, and extract dates, times, and/or periods from the unstructured input file. Additionally or alternatively, for example, the datefinder python package may be used to perform date tagging operations.

Figure 2B:
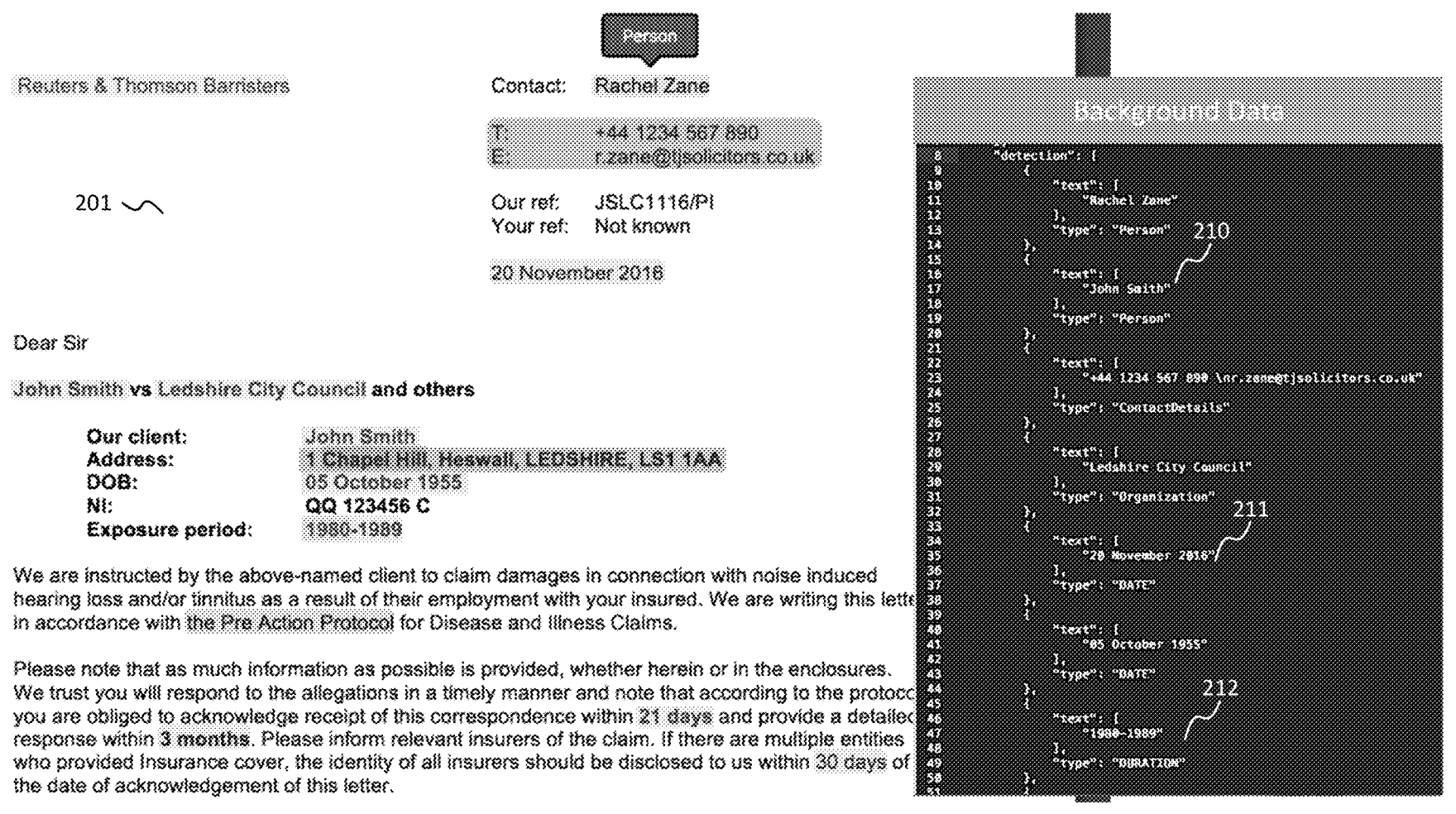

FIG. 2B shows an example of subsentence item identification and tagging. As can be seen, unstructured input file 201 contains various entities, dates, and time periods. Structure 202 shows the identification and tagging of these various subsentence items. For example, element 210, "John Smith," has been identified and tagged as a "Person." Similarly, element 211, "20 Nov. 2016," has been identified and tagged as a "DATE." Element 212, "1981-1989," has been identified and tagged as a "DURATION."

It will be appreciated that although the functionality of split and tag module 130 allows system 100 to split the unstructured input files into sentences and to identify and tag subsentence items, there is yet no relation between the different subsentence items, the sentences, and the unstructured input file. To provide such relations, split and tag module 130 provides for indexing functionality. Indexing allows for providing a relationship between the subsentence items, the sentences, and the unstructured input file. In some implementations, indexing includes three search indices: a document level index, a sentence level index, and a subsentence index. In some embodiments, the subsentence index may be a document level subsentence index.

The document level index may include an ID field, a document type field, and a document content field. The ID field may include the case number of the case associated with the document, and document number, and may be generated when the document is selected for input, or when the document is uploaded for OCR. The document type field may specify the type of document (e.g., letter of claim, tax schedule, letter of defense to claimant, etc.). The document content field may include the unstructured input file content as raw text.

The sentence level index may include a case ID field, a document ID field, a document type field, a sentence ID field, a sentence text field, a raw sentence level subsentence tag field, and a normalized sentence level subsentence tag field. For example, with reference to FIG. 2C, sentence level index 220 may include case ID 221 of the case associated with the document, and document ID 222. The case ID and document ID may be generated when the document is selected for input, or when the document is uploaded for OCR. Sentence level index 220 may also include document type 223 specifying the type of document. Sentence ID 224 indicates the ID of a particular sentence. In some embodiments, the ID of a sentence may correspond to the order of appearance of the sentence within the document. Sentence text field 225 may include the text of the corresponding sentence in raw text. As will be noted, sentence text field 225 may contain semantically coherent sentences, or subsentence items. In a case where the sentence text field includes a subsentence item, a sentence level subsentence tag field may be included. For example, date tags field 226 may include a date tag for the particular sentence. In some embodiments, the date tag may be raw or may be normalized. In other embodiments, a tag field may be included for other subsentence items. For example, a raw sentence level entity tag (not shown) may be provided to include an entity tag for a subsentence item found in the corresponding sentence. Additionally, or alternatively, a normalized sentence level entity tag (not shown) may be provided to include an entity tag for a subsentence item found in the corresponding sentence.

As noted above, the subsentence index may be a document level subsentence index. In this case, the substance index may include a case ID field, a document ID field, a normalized subsentence item text field, a raw subsentence item text field, a context strings field, and an offset field. The case ID may include the ID of the case associated with the document, and the document ID field may include the ID of the document where a particular subsentence item is found. The case ID and document ID may be generated when the document is selected for input, or when the document is uploaded for OCR. The normalized subsentence item text field may include the normalized subsentence item text. For example, a particular subsentence item may be identified and tagged as an entity. In this case, the normalized subsentence item text field may include the normalized name of the entity. The raw subsentence item text field may include the raw subsentence item text as it appears in the unstructured input file. For example, where a particular subsentence item may be identified and tagged as an entity, the raw subsentence item text field may include the name of the entity as it appears in the unstructured input file. The context strings field may include strings within which the entity appears, or that are proximate to the subsentence item within the document. In aspects, the proximity may be configurable and may be specified as a number of words, letters, spaces, or characters from the subsentence item. The offset field may include a value indicating the location of the subsentence item within the unstructured input file relative to the start of the unstructured input file, or the location of the subsentence item within a sentence relative to the start of the sentence.

With reference back to FIG. 1, search and filter module 140 may be configured to apply extraction rules to the split and tagged unstructured input file in order to identify and extract relevant content for generating a structured output report based on a predefined template. In some aspects, the extraction rules may leverage the splitting, tagging, and indexing functionality of split and tag module 130 to provide smart filtering and searching capabilities. For example, the split and tagged unstructured input file may include indexed sentence content, such as sentence text, IDs, and subsentence tags. This may allow functionality to perform smart filtering and searching using extraction rules.

In aspects, the extraction rules of embodiments may include various rules for identifying information within an unstructured document relevant to a particular section of a predefined template. This may be accomplished using various search and filtering functions provided by search and filter module 140. In some cases, the extraction rules may include a combination of any of the following search and filtering functions. It will be appreciated that the following search and filtering functions are intended to be exemplary, and not limiting. Those of skill in the art will appreciate that other search and filtering functions may also be used to implement extraction rules. Additionally, it is noted that extraction rules may be included in predefined templates and may associated with particular fields. In embodiments, extraction rules may be defined in a predefined template in a default form. For example, the default extraction rules may include a combination of any of the search and filtering functions discussed below. During operation, a user may select a template having default extraction rules, which may be applied to the unstructured input files. As will be discussed in more detail below, a user may determine to modify the default extraction rule. For example, the user may determine to modify the default rules in the predefined template to include any combination of the search and filtering functions discussed below, to include searches, filters, keywords, etc., in order to refine the results obtained for the associated field.

In an embodiment, the search and filtering functions may include text keyword filters that may be implemented to search for a particular keyword in a sentence or an entity. In this case, the sentence and subsentence indices may be leveraged to identify the indexed data of any sentence and/or entity in which the keyword appears. For example, the content may be filtered to identify all sentences containing the phrase "hearing protection." The result according to aspects of the present disclosure would be not only identification of sentences containing the keyword, but also the sentence IDs, the case IDs, the document IDs, and any subsentence tag associate with that sentence.

Another search and filtering function may include an order of occurrence filter. In this case, the order of occurrence of a particular item (e.g., a sentence, or an entity) may be obtained by application of this filter. The order of occurrence may indicate the order of appearance of the item, either within an unstructured input file or within a sentence. For example, for a particular date, the particular date may be the first date mentioned in an unstructured input file. In this case, the order of occurrence may be found to be 1. In a particular application, a user may determine that the first date that appears within a document of type "letter of claim" may be the date of the claim. In this case, application of the order of occurrence filter may yield a result that can be leveraged to identify the particular date as the date of the claim. For example, an extraction rule associated with a date of claim section of a predefined template may specify that for documents of type "letter of claim," a date with an occurrence of 1 may be determined to be the date of the claim.

Still another search and filtering function may include a search for relative quantities. For example, this search function may compare values and return the smaller or larger value in the unstructured input file or sentence. In some aspects, the object returned may be relative to a static value. For example, a filter may be defined to extract any date that falls before a given date. In some implementations, a filter may be defined to return items that appear before another given item. For example, a filter may return all dates that appear within a document before the last date that appears within the document.

Figure 2D:
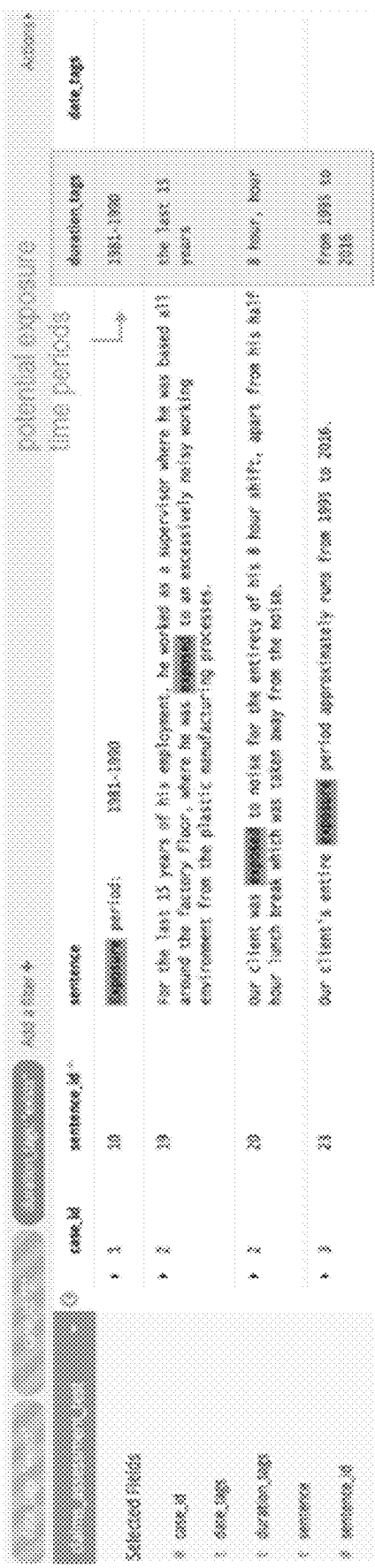
FIG. 2D shows an example of a search for subsentence items within a context of a keyword filter in accordance with embodiments of the present disclosure.

Yet another search and filtering function may include a search for subsentence items within a context of a keyword. For example, a filter may be defined to extract periods of time that are lexically proximate to a keyword, such as "exposure." In this case, the filter may return durations found within a sentence proximate to the term "exposed," or semantically similar terms. FIG. 2D illustrates this example. In this case, a user may apply this filter in an extraction rule for identifying potential exposure time periods, which may then be included in a predefined template.

Search and filter module 140 may also be configured to provide functionality to facilitate extraction of relevant statements within the unstructured input files. In some cases, a template may specify that for a particular section, statements relevant to a particular fact, or facts, are to be included. For example, in one particular case, an important factor for determining liability of an employer may be to determine whether the employer provided protective equipment to the claimant. In this case, a predefined template for generating a structured report for the case may include a section for including information regarding the provision of hearing protection. As will be appreciated, there are various ways of expressing information related to this fact. For example, this fact could be expressed in the text as "Our client was never provided with hearing protection," or "Your company failed to provide adequate protective gear in the form of 'hearing protection.'" Search and filter module 140 provides functionality to account for such textual differences when identifying and extracting factual information.

Figure 2E:
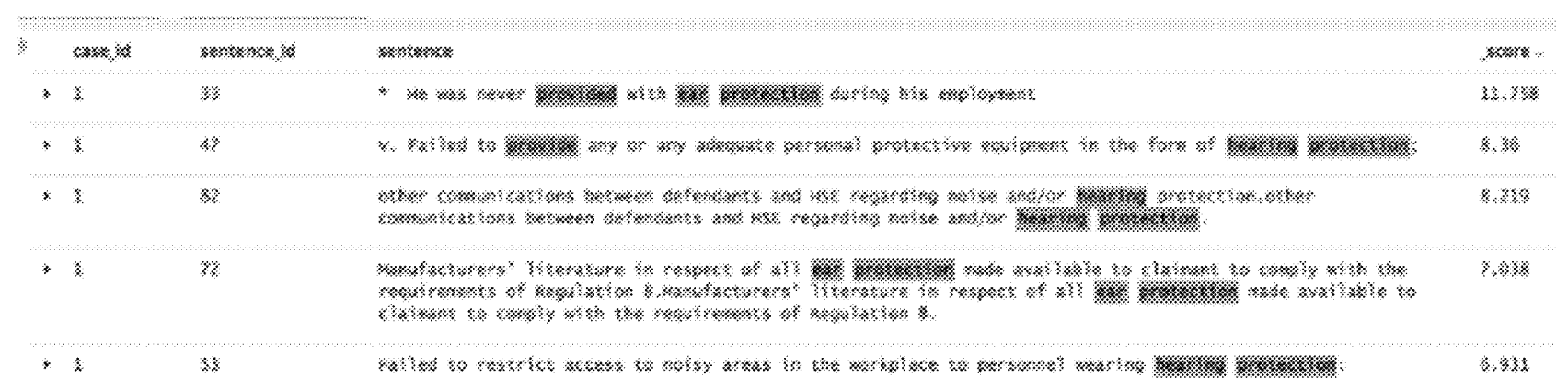

In aspects, one approach to facilitate extraction of relevant statements within the unstructured input files may include a Boolean keyword search. In this approach, statements including a keyword related to the factual information desired may be extracted. As such, this approach may filter the unstructured text to include only the results that match the query (e.g., any sentence containing "hearing OR protection"). In embodiments, the results may be ranked based on word overlap using, e.g., term frequency-inverse document frequency (TF-IDF) algorithms or similar statistical analysis. FIG. 2E illustrates this example.

Another approach to facilitate extraction of relevant statements within the unstructured input files may include a semantic similarity search. For example, a semantic textual similarly algorithm may be applied to the unstructured input files to identify sentences that are semantically similar. In this case, an extraction rule may be defined to include a semantic textual search using an input sentence. For example, following in the above case illustrated in FIG. 2E, an input sentence for the semantic textual search may be used describing a fact such as "the employer did not provide the client with hearing protection." The semantic textual search may then identify and extract all sentences within the unstructured document including semantically similar sentences.

Figure 2F:
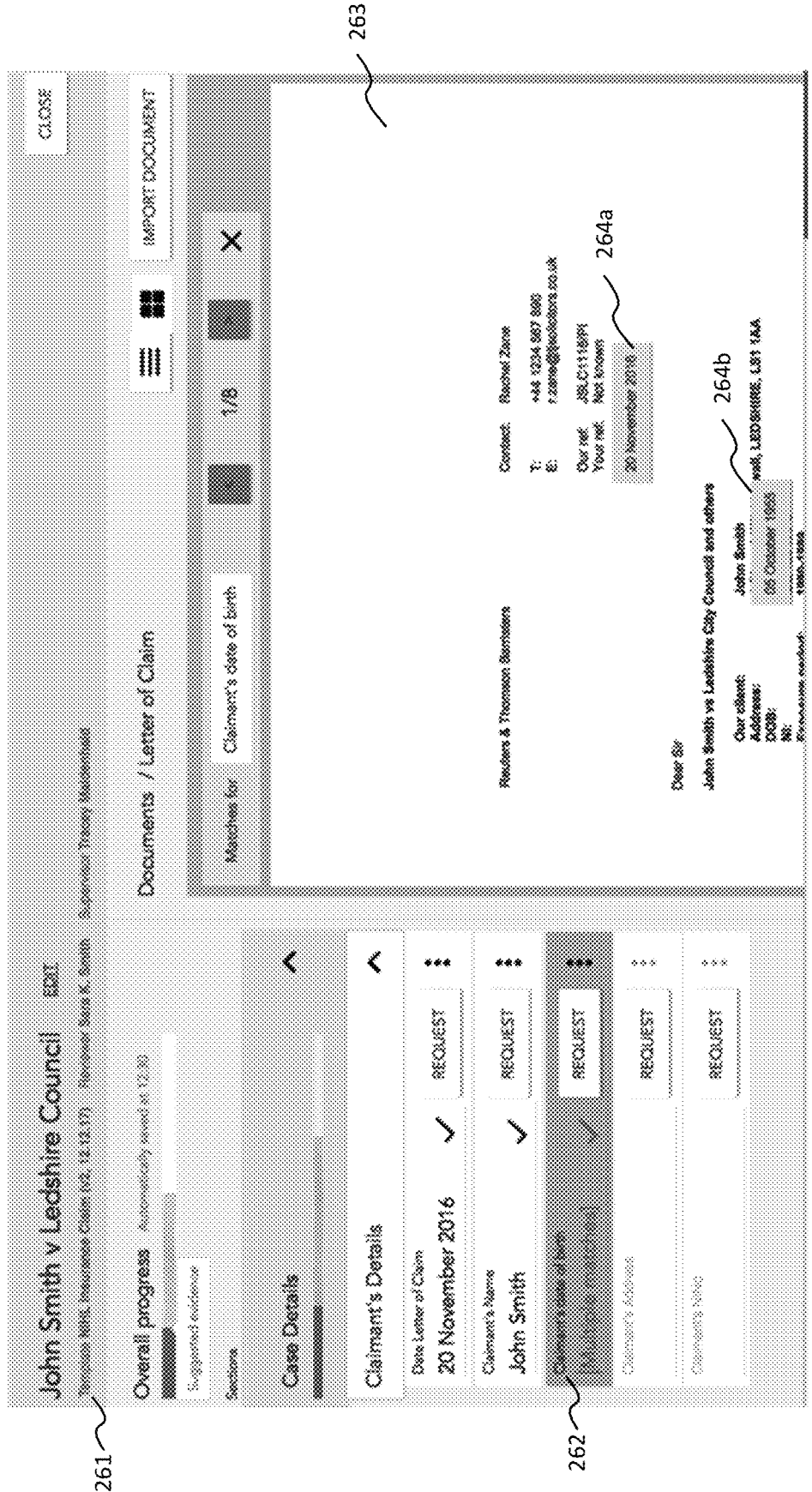
FIG. 2F shows an example view of a graphical user interface (GUI) configured in accordance with embodiments of the present disclosure.

Content annotator and output generator 160 may be configured to provide functionality for annotating the content extracted from the unstructured input files based on the extraction rules to facilitate collection of relevant content to be included in the structured output report based on the predefined template. In aspects, the annotations to the extracted content may include highlighting, or otherwise marking, the relevant content within a graphical representation of the unstructured input file in a GUI. For example, as shown in FIG. 2F, a predefined template 261 may specify a field requiring a field 262 for including the "claimant's date of birth." As discussed above, extraction rules associated with field 262 may also be defined by template 261. As shown in FIG. 2F, the extraction rules for field 262 returned multiple potential matches. Section 263 may include a representation of the unstructured input file content where the potential matches for field 262 may have been found. The functionality of content annotator and output generator 160 may operate to mark the potential matches to the extraction rules by, e.g., highlighting potential dates 264a and 264b that may be the claimant's date of birth. This functionality of content annotator and output generator 160 is discussed in further detail below with respect to operational aspects of the present disclosure.

Content annotator and output generator 160 may also be configured to generate the structured output report based on the extracted relevant content associated with each of the predefined template fields and section. In aspects, the structured output report may be generated by populating the structured output report with the relevant content extracted for each corresponding field and section of the associated predefined template. In some embodiments, content annotator and output generator 160 may be configured to generate, structure, and populate the GUI provided by user terminal 170.

Figure 3:
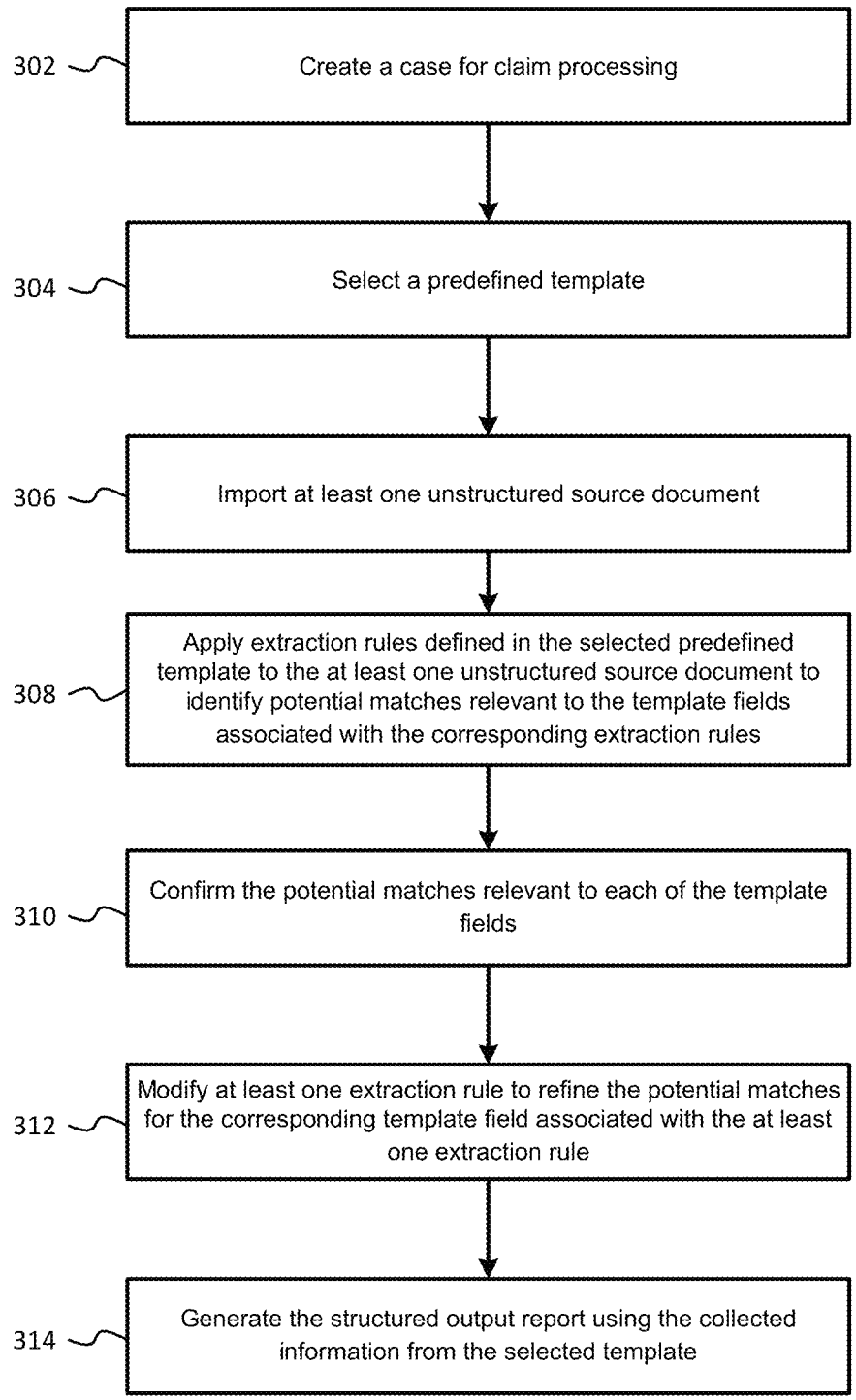
FIG. 3 shows a functional block diagram illustrating an example flow executed to implement aspects of the present disclosure.

FIG. 3 shows a high level flow diagram of operation of a system configured in accordance with aspects of the present disclosure for providing computer-assisted guided review of unstructured data to generate a structured data output based on customizable template rules in accordance with embodiments of the present disclosure. For example, the functions illustrated in the example blocks shown in FIG. 3 may be performed by system 100 of FIG. 1 according to embodiments herein.

In general terms, embodiments of the present disclosure provide functionality for search capabilities that go beyond a basic keyword search. Aspects of the present disclosure allow for the combination and storage of not only keyword searches but also more advanced semantic searches, and for associating the searches to specific portions of a predefined template. As such, the information extraction and review process by an end-user is significantly improved. In addition, the various aspects providing for content annotation allow a user to more easily collect and link individual statements to a predefined template section (e.g., evidence for liability, evidence for limitation, etc.). This enables a user to rapidly build up a large set of annotated structured data, based on unstructured source documents. Furthermore, various aspects of the present disclosure provide the ability for a user to dynamically customize and review extraction rules, which creates a level of transparency that is lacking in existing systems. This also allows the user to describe and create extraction mechanisms for more complex concepts, such as "date of birth," "defendant's name," etc. Therefore, Applicant notes that the solution described herein is superior, and thus, provides an advantage over prior art systems.

One application of the techniques and systems disclosed herein may be in a claims processing environment. As noted above, claim processing involves analysis of large amounts of documents and data, which are usually unstructured. Typically, the documents are analyzed and reviewed manually by a user. The user reviews the document and parses the content to identify information relevant to a particular use. For example, a report may require certain data, which the user must then find and extract from the unstructured documents. In another example, there may be questions that may be answered by sections of the unstructured document, but the user must find, identify, and extract those sections from the unstructured document. Even in systems that use extraction algorithms, the extraction algorithms are usually a black box that does not provide transparency into the extraction process or allows a user to make dynamic modifications. Aspects of the present disclosure provide an advantageous system that allows a user to not only easily identify potential relevant content, but to also dynamically modify the extraction rules for a more flexible, responsive, and robust approach. It is again noted that the discussion that follows, which is directed to claim processing, is merely an example embodiment and should not be construed as limiting in any way.

At block 302, a user creates a case for a claim processing. For example, a user may determine to review an insurance claim, or a personal injury claim, and may create a new case for the claim. In some aspects, the case review may include generating a structured output report (e.g., structured output report 250 of FIG. 2A), which may include various information to be included in various fields and sections of the structured output report. The information to be included in the structured output report may be obtained from various unstructured source documents.

Figure 4A:
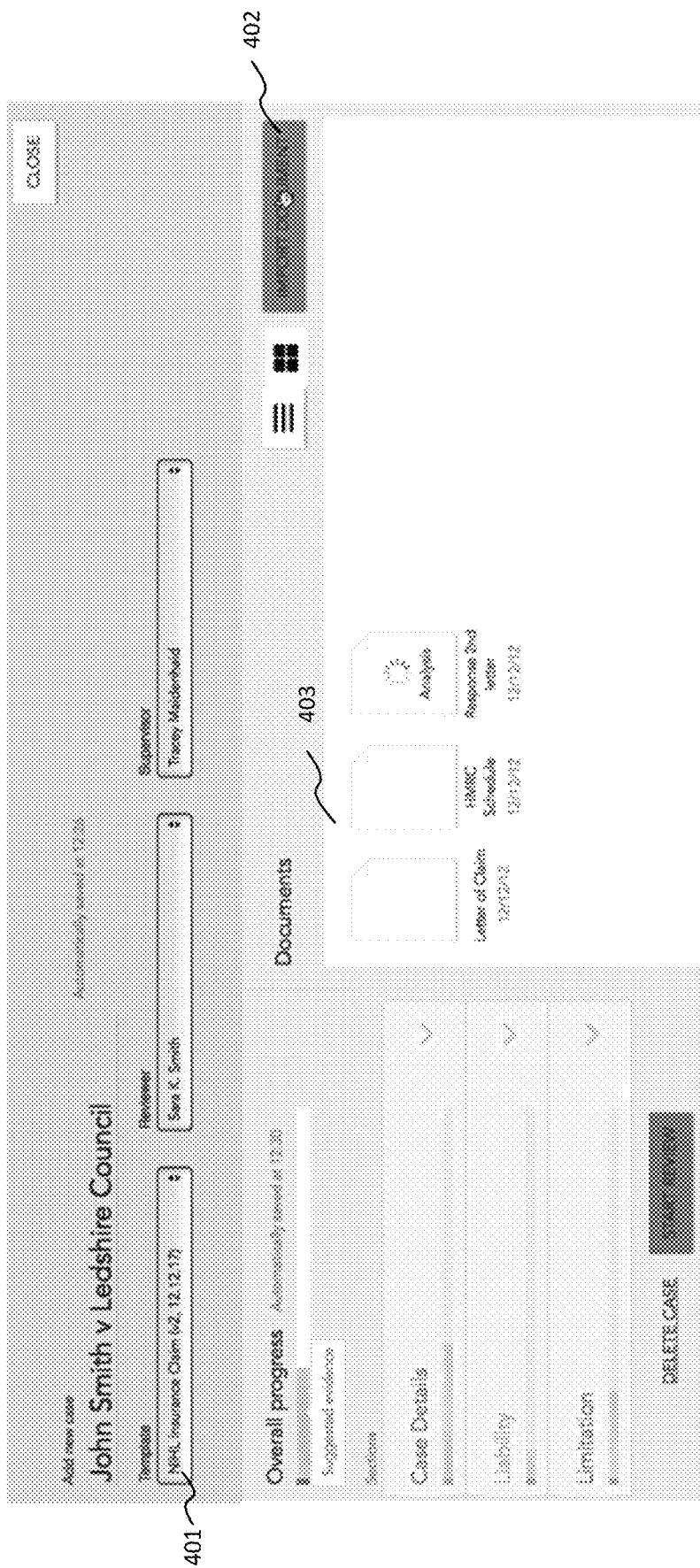
FIG. 4A shows another example view of a GUI configured in accordance with embodiments of the present disclosure.

With the case created, the user selects a template to use at block 304. For example, with reference to FIG. 4A, a user may select template 401 from a plurality of predefined templates. In aspects, the predefined template may be a template stored in database 120 of FIG. 1. The template may be a previously created template, e.g., by a software provider, a user with administrative privileges, a supervisor, etc. In aspects, the previously created template may be created using functionality of templates and rules module 150. The template selected by the user may specify the structure, and fields and sections for which information is required in order to generate the structured output report. The template may also include, for each field and section, the type of information required, and at least one extraction rule for extracting the relevant content from the unstructured source documents. In a sense, the template may provide the system information on what type of content is required for each field, and how to find the content in the unstructured source documents.

Referring back to FIG. 3, at block 306, the user may import at least one unstructured source document. For example, a user may activate GUI element 402 to import unstructured source documents 403. In aspects, the unstructured source documents may include any one or more of a letter of claim, a tax schedule, a response letter, emails, etc. The unstructured source documents may be unstructured, and/or may have a non-searchable format. For example, the unstructured source documents may be scans of the corresponding document. In this case, the unstructured source document may be OCR'd or otherwise processed to digitize the non-searchable content and convert it into searchable content.

Figure 4B:
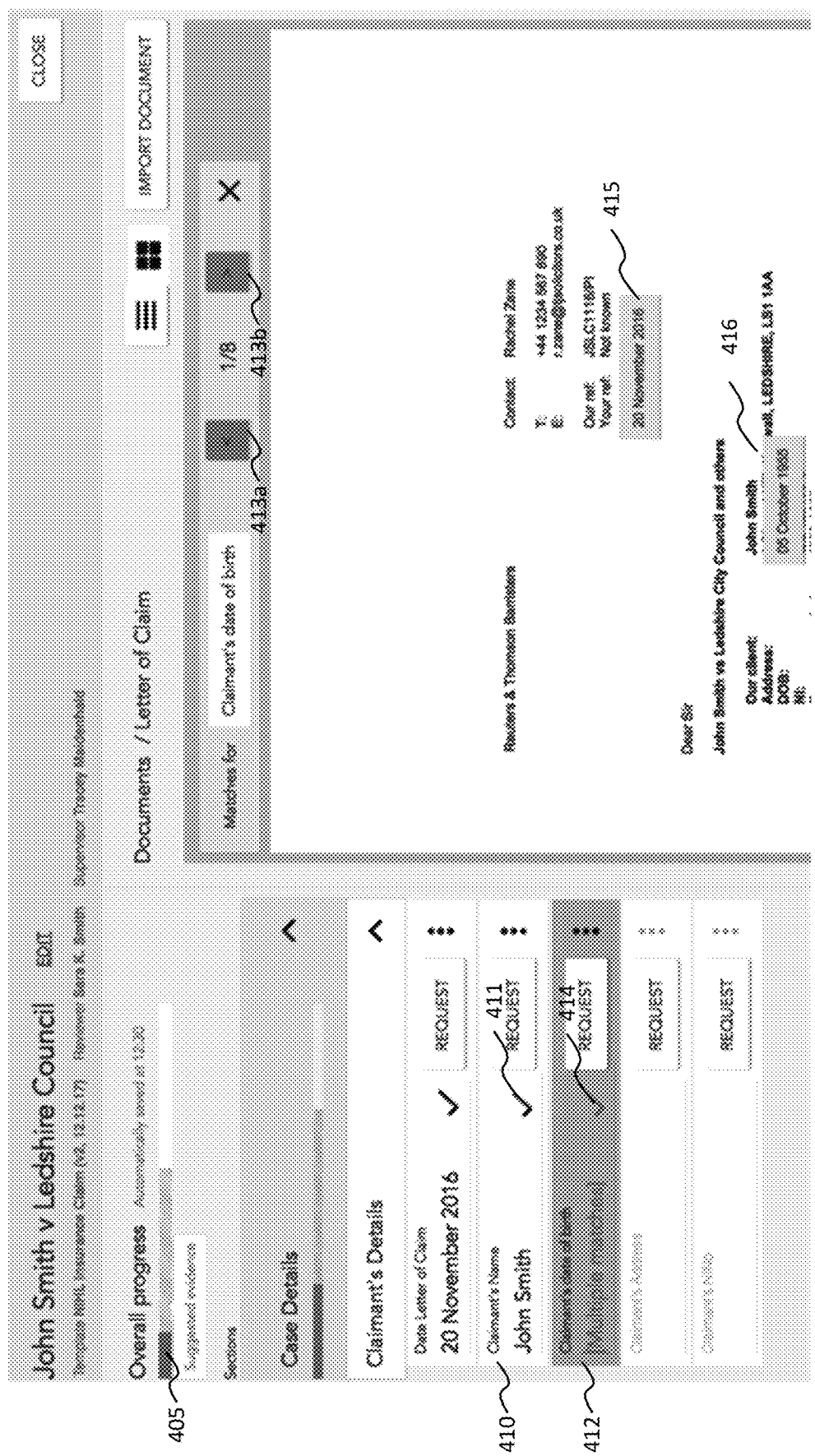
FIG. 4B shows another example view of a GUI configured in accordance with embodiments of the present disclosure.

At block 308, the extraction rules defined in the selected template are applied to the content of the unstructured source documents in order to identify and extract the content relevant to the template fields associated with the corresponding extraction rules. As described above, prior to the application of the extraction rules, the content of the unstructured source documents may be split and tagged in accordance with the functionality of split and tag module 130 of FIG. 1, in order to identify, tag, and index individual sentences and subsentence items within unstructured source documents. In aspects, the application of the extraction rules results in potential matches for the various template fields. For example, as shown in FIG. 4B, application of the extraction rules defined in the selected template results in potential matches for the various template fields.

At optional block 310, the user may confirm the potential matches for each of the template fields. For example, for field 410 in FIG. 4B, which is configured to include the claimant's name, a potential match of "John Smith" has been identified. The user may confirm the match by activating element 411, in which case the system assigns the match as confirmed. With respect to field 412, which is configured to include the claimant's date of birth, the application of the extraction rules associated with this field has yielded multiple potential matches. In this case, the user may toggle through the multiple potential matches to identify the correct match. For example, the user may activate element 413a or 413b to toggle through the multiple potential matches and then activate element 414 to confirm the correct match for field 412. In embodiments, the potential matches are highlighted in the graphical representation of the unstructured source document in order to facilitate rapid identification of the potential match. For example, multiple potential matches 415 and 416 are highlighted as potential matches for field 412. In embodiments, as the user toggles through the multiple potential matches for field 412, the corresponding potential matches are highlighted in the unstructured source document, such as that when the user toggles to potential match 415, only potential match 415 is highlighted in the unstructured source document.

Figure 4C:
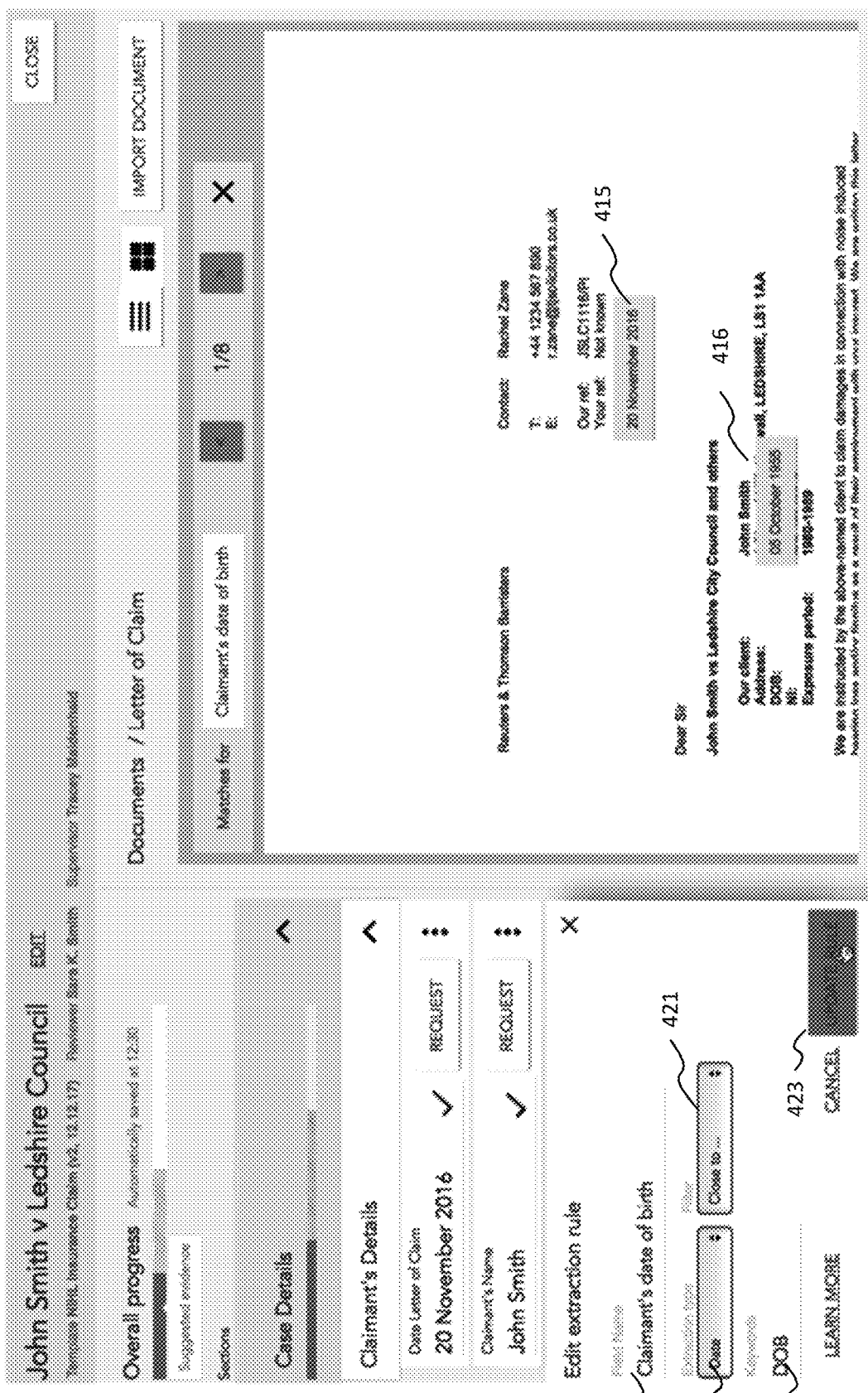
FIG. 4C shows another example view of a GUI configured in accordance with embodiments of the present disclosure.
Figure 4D:
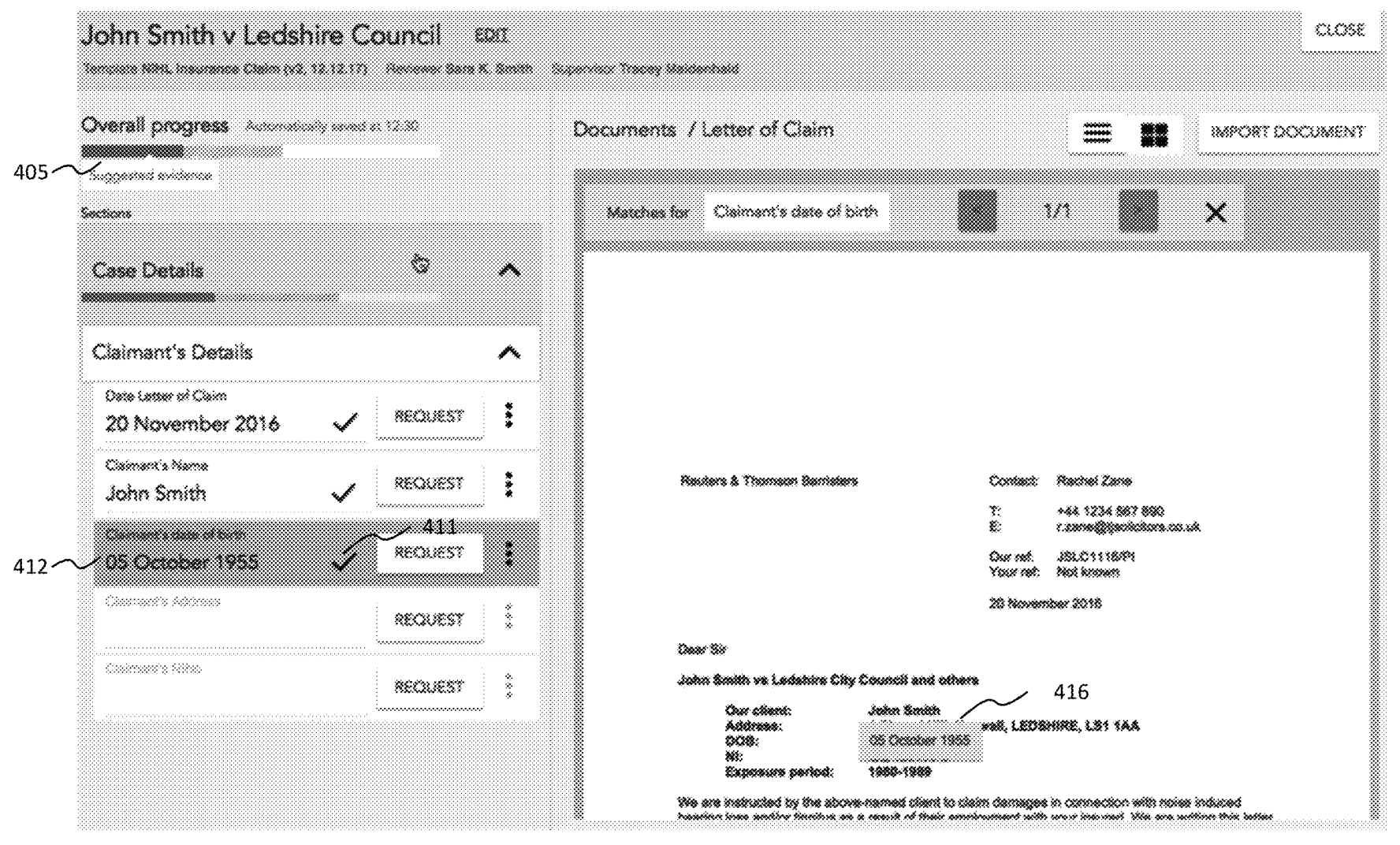
Figure 4E:
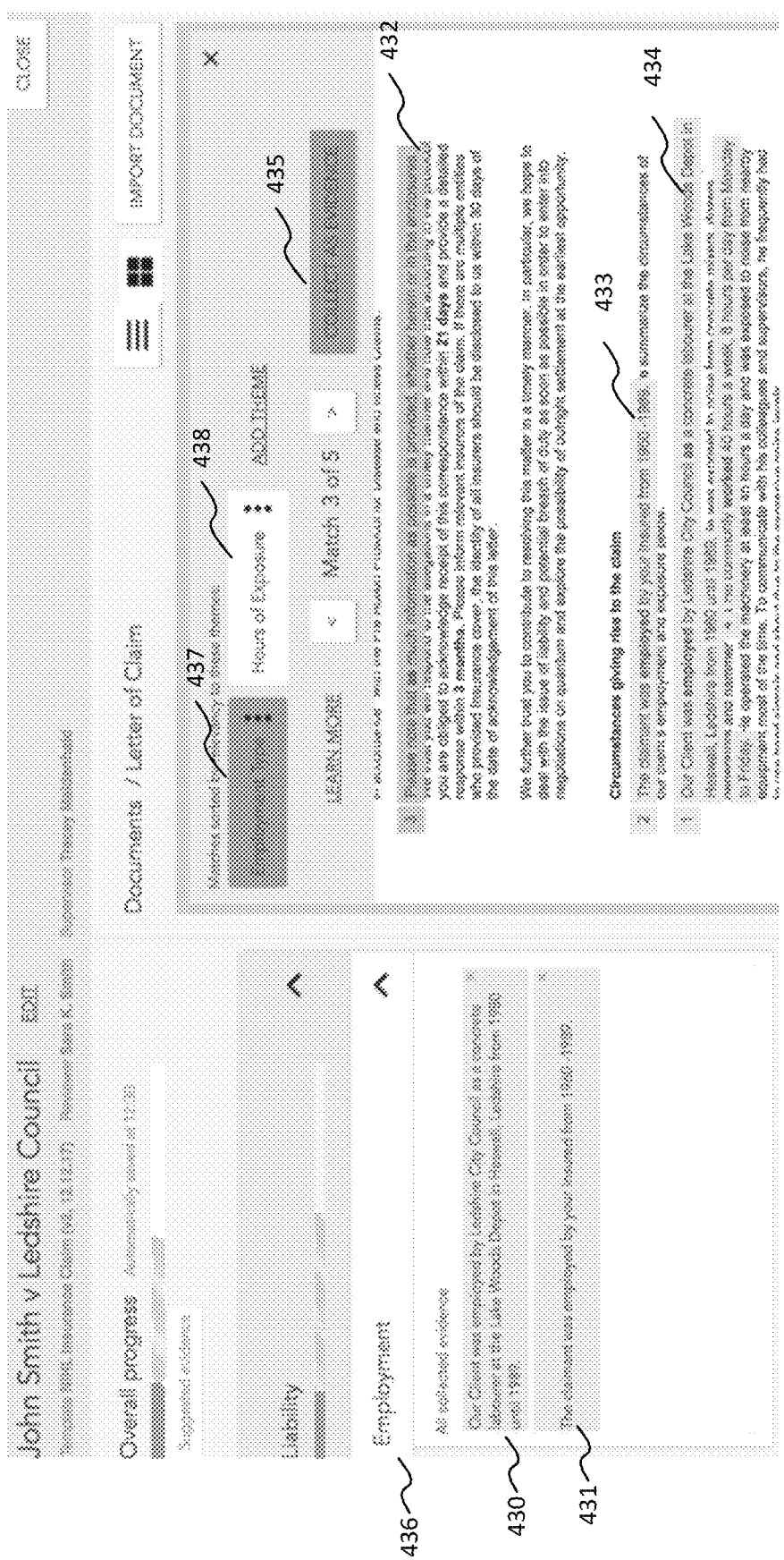
FIG. 4E shows another example view of a GUI configured in accordance with embodiments of the present disclosure.

In embodiments, the selected template may define a section or sections for collection of evidence. In this case, the section may require statements, which may include sentences related to a particular type of evidence (e.g., liability, employment, etc.). In addition, themes may be specified for each type of evidence. For example, as shown in FIG. 4E, the selected template may specify a section 436 for collection of employment evidence. The collection of employment evidence may include themes 437, employment type evidence, and theme 438, hours of exposure type evidence. In aspects, the themes may include extraction rules that specify how the relevant data may be identified and presented to the user. For example, for employment type evidence, theme 437 may specify that sentences including keywords such as "employed" and "as," or semantically similar terms, may be identified as employment type evidence. In addition, the extraction rules for employment type evidence may specify that semantically similar statements to the statements "claimant was employed as a construction worker," or "claimant was employed from 1981 to 1992" may be identified as employment type evidence. In this case, statements 432, 433, and 434 have been identified as potential matches for employment type evidence. The user may toggle through the various identified statements, and, upon deciding that a particular statement should be collected as evidence, may activate element 435 to collect the statement. In that case, the statement may be included in the evidence collected, such as collected statements 430 and 431, which correspond to potential matches 434 and 433, respectively. In some cases, a blacklist may be included as part of the extraction rules for a particular theme, which may include blacklist statements. In this case, statements in the unstructured documents that are semantically similar to the blacklist statements may not be included as the corresponding theme.

With reference back to FIG. 3, at block 312, the user may modify at least one extraction rule to refine the potential matches for the corresponding template field associated with the at least one extraction rule. For example, for field 412 of FIG. 4B, multiple potential matches 415 and 416 have been identified by the extraction rule associated with field 412. This modification may be shown by a GUI generated and configured in accordance with the functionality of content annotator and output generator 160 of FIG. 1. As shown in FIG. 4C, a user may modify the extraction rules associated with field 412 to further refine it. For example, the extraction rule may specify a type "date" 420 for field 412. The user may add filter 421, which defines a lexical proximity filter that extracts dates within proximity to a keyword. In this case, the user may specify keyword 422 as "DOB." Based on this, the updated extraction rules may extract any date that is close to the keyword "DOB." In some aspects, the proximity may be defined in terms of words, such as within 10 or less words of the keyword, or may be specified in terms of characters. As the user activates the updated extraction rule by activating element 423, the updated extraction rule is applied to the identified content, which is refined, as seen in FIG. 4D. As shown in FIG. 4D, potential match 425 is no longer provided and instead, only potential match 416, which is in close lexical proximity to the keyword "DOB" is presented to the user as a potential match to field 412. The user may then confirm potential match 416 by activating element 411.

It is appreciated that some or all such fields of a template may be refinable and the type of refinement may be dependent on source documents and a user preferences. Hence, the above rule modification is provided by way of example, and one of ordinary skill in the art would understand that various modifications may be possible when provided with the present system.

In embodiments, a progress bar 405 may be presented to the user to provide a visual indication of the fraction of information required that has been extracted. In aspects, a different visual indicator may be used to represent information that has been confirmed than to represent information that has not been confirmed. Therefore, as more potential matches are confirmed, the indicator in progress bar 405 increases.

In some embodiments, modifying at least one extraction rule to refine the potential matches identified by the at least one extraction rule may include providing rule modification recommendations. In aspects, the rule modification recommendations may include suggested filter recommendations to the user to refine at least one extraction rule. In aspects, the suggested filter recommendations may be presented (e.g., displayed) to the user, and the user may select one of the recommendations, in which case, the suggested filter may be implemented, or included, in the extraction rule. In this manner, the extraction rule may be refined by the selected suggested filter. In some cases, the user may not select any of the recommended suggested filters, in which cases, although the rule may not be refined by the suggested filters, nonetheless the user non-selection of the suggested filter recommendations may be used to refine the process of generating the recommendations.

It is noted that herein, a potential match identified by an extraction rule may also be referred to as a positive sentence candidate. A positive sentence candidate may refer to a sentence that is identified (e.g., by an extraction rule) as potentially including the target extraction term. For example, an extraction rule may be configured to search for and extract a particular target extraction term (e.g., extract annual revenue figure of a current time period) from a set of documents. In aspects, the extraction rule may be applied to the set of documents (e.g., to each sentence in each document of the set of documents) to identify sentences that the extraction rule determines potentially may include the target extraction term. These identified sentences are referred to as a positive sentence candidates. These sentences are candidates because they "potentially" include the target term, but whether or not these sentences actually include the target extraction term is confirmed afterwards, either by the user, by a machine learning module, or implicitly based on the user's action. For example, each positive sentence candidate may be reviewed by the user and if the user confirms that a positive sentence candidate actually includes the target extraction term (e.g., the user selects the positive sentence candidate for extraction or otherwise indicates that the positive sentence candidate includes the target extraction term), then that positive sentence candidate is determined to be a positive sentence. As such, a positive sentence is a sentence that is confirmed (e.g., by the user or user's action, and/or by a machine learning module) as including the target extraction term. In some aspects, some positive sentence candidates may be confirmed as actually being negative sentence by a user not selecting these positive sentence candidates for extraction, based on these positive sentence candidates not including the target extraction term. In these cases, these positive sentence candidates may be labeled as negative sentences based on the user non-selection.

On the other hand, a negative sentence candidate may refer to a sentence that is identified (e.g., by an extraction rule) as potentially not including the target extraction term. In aspects, the extraction rule may not implicitly label a sentence as a negative sentence candidate, but the indication that a sentence is a negative sentence candidate may be that the sentence is not indicated as being a positive sentence candidate. For example, following the example above, any sentence in the set of documents not indicated to be a positive sentence candidate may be considered a negative sentence candidate. A negative sentence candidate may be confirmed as a negative sentence by a user non-selection of the negative sentence candidate for extraction. As such, a negative sentence is a sentence that is confirmed (e.g., by the user or user's action, and/or by a machine learning module) as not including or excluding the target extraction term.

As used herein, a target extraction term may be a term, phrase, word, figure for which a user applying the extraction rule is searching. In aspects, the target extraction term may be the target of the extraction rule, or a search associated with the extraction rule. For example, a user may be searching for mentions of a current revenue of a company in document(s). The user may apply, to the document(s), an extraction rule that is configured to obtain sentences in which a current revenue of a company is mentioned. As noted above, sentences identified by the extraction rule as mentioning a current revenue of the company are indicated and/or labeled as positive sentence candidates. Conversely, sentences that are not identified by the extraction rule as mentioning a current revenue of the company may be indicated and/or labeled as negative sentence candidates (e.g., may be indicated as negative sentence candidates by the fact that these sentences are not labeled or indicated as positive sentence candidates).

It would be appreciated that some sentences in a document may mention an annual revenue (e.g., may mention the word "revenue") or similar terms, but may not be in the context of a current revenue of a company. It would be appreciated that these sentences may be negative sentences, as these sentences do not include the target extraction term, but an extraction rule that is not sufficiently refined may still identify them as positive sentence candidates. In other words, an extraction rule may identify false positives. Aspects of the present disclosure provide techniques methods, and systems for refining the extraction rules to reduce these false positives.

It would also be appreciated that some sentences may in fact mention a current revenue of a company, and these sentences may mention the current revenue of the company using the word "revenue," or may use different words. As noted above, these sentences may be referred to as positive sentences. In the example mentioned above, the current revenue of the company is the target extraction term, although a target extraction term may not be the actual word "revenue," but rather a term conveying the meaning of a company's current revenue. Therefore, in this example, a sentence that mentions the current revenue of the company (e.g., the target extraction term), either using the word "revenue" or other words that convey the target extraction term, may be referred to as a positive sentence. On the other hand, a sentence that does not mention or excludes the current revenue of the company (e.g., the target extraction term), either using the word "revenue" or other words that convey the target term, may be referred to as a negative sentence.

In aspects, a target search term (also referred to herein as a "keyword") may refer to a term that is used by an extraction rule to determine whether a sentence is a positive sentence candidate. For example, an extraction rule configured to extract a current revenue of the company may include a search for target search terms such as "revenue." In this case, the word "revenue" may be a term used by the extraction rule to identify sentences (e.g., sentences that include the term "revenue") as potential matches for the target extraction term (e.g., positive sentence candidates). As such, in a simple, unrefined extraction rule, the extraction rule may identify any sentence including the word "revenue" (e.g., the target search term) as a positive sentence candidate. A user (or a machine learning module) may then confirm (e.g., by selecting the sentence) whether the positive sentence candidate that includes the term "revenue" actually includes a mention of a current revenue of a company.

In aspects, as noted above, a positive sentence candidate may be a sentence identified as a potential positive sentence by the extraction rule. As will be appreciated, an extraction rule may identify a number of positive sentence candidates, and some of those positive sentence candidates may not actually be positive sentences but may be false positives. In the same manner, a rule may identify a number of negative sentence candidates, and some of those negative sentence candidates may not actually be negative sentences but may be false negatives. Aspects of the present disclosure provide for methods and systems to increase and/or refine the precision (e.g., ratio of sentences correctly identified as "positive sentences" to the total number of sentences identified as positive sentence candidates) and recall (e.g., ratio of sentences correctly identified as "positive sentences" to the total number of all true positive sentences the user expects or may identify in the set of documents) of extraction rules by providing suggested filter recommendations that a user may implement into the extraction rules to refine the extraction rule to increase the precision of the rule, thereby decreasing the number of false positives, or false negatives.

In embodiments, the suggested filter recommendations for an extraction rule may include suggested filters defining keywords or target search terms that may be included or excluded by the extraction rule for identifying positive sentence candidates. For example, a suggested filter may include at least one include keyword, and/or at least one exclude keyword. In aspects, an include keyword may be a word whose presence in a sentence an extraction rule may search for when determining whether the sentence is a positive sentence candidate. In aspects, the extraction rule may determine that a sentence is a positive sentence candidate when the included keyword is present in the sentence. In aspects, an exclude keyword may be a word whose absence in a sentence an extraction rule may search for when determining whether the sentence is a positive sentence candidate. In aspects, the extraction rule may determine that a sentence is a positive sentence candidate when the exclude keyword is absent from the sentence. In aspects, an include keyword may be a word that an extraction rule looks for when determining positive sentence candidates, and an exclude keyword may be a word that the extraction rule avoids when determining positive sentence candidates. For example, an exemplary extraction rule that is configured to search for mentions of a company's current revenue may include a filter that includes a set of include keywords, e.g., an INCLUDE GROUP, and a set of exclude keywords, e.g., an EXCLUDE WORD. In this example, the extraction rule may identify, as positive sentence candidates, those sentences that include at least one of the include keywords from the INCLUDE GROUP and NONE of the exclude keywords from the EXCLUDE GROUP. For example, given INCLUDE("sales", "revenue")+EXCLUDE("forecasted", "expected"), the extraction rule for extracting a current revenue of a company may identify positive sentence candidates by searching for sentences that mention the keyword "sales" or the word "revenue" and do no mention the keywords "forecasted" or "expected". In aspects, suggested filter recommendations may suggest terms to be added into an existing or new INCLUDE group, and the user may decide which option. Additionally, a simple include keyword suggestions may be added to the first INCLUDE group in a current implementation and EXCLUDE keywords may be added to a single exclude group.

In some embodiments of the present disclosure, a recommended suggested filter may include a combination of include and/or exclude keywords. For example, a suggested filter may be recommended that includes at least one include keyword and at least one exclude keyword. In these cases, an extraction rule implementing the suggested filter may determine that a sentence is a positive sentence candidate when the at least one include keyword is present in the sentence, and the at least one exclude keyword is absent from the sentence. In this manner, the suggested filter provides an improved extraction rule, as it takes into account not only whether a keyword's presence is indicative of the sentence being a positive sentence, but also whether the keyword's absence is indicative of it being a negative sentence. For example, one exemplary suggested filter for an extraction rule that is configured to search for mentions of a company's current revenue may be "INCLUDE('revenue') AND EXCLUDE('range', 'expected', 'guidance')". In this example, such a suggested filter may refine the extraction rule by providing a more precise search of the target extraction term mentions in which a sentence may be determined to be a positive sentence candidate when the sentence includes the keyword "revenue," but excludes the keywords "range," "expected," and "guidance."

In some embodiments, a suggested filter for an extraction rule may be generated, as will be discussed in more detail below, based at least in part on data previously identified as relevant to a query associated with the extraction rule. For example, the suggested filter for the extraction rule may be based on previous examples of positive and negative sentences (e.g., sentences which have been previously determined and confirmed to be positive sentences or negative sentences with respect to the target extraction term and/or the extraction rule). For example, an extraction rule to extract current revenue sentences may be previously applied a number of times and may yield a number of examples of positive and/or negative sentence candidates that are in turn confirmed by the user as "true positive" and/or "true negative" sentences. These examples of positive and/or negative sentences may be used to generate the suggested filter recommendations as will be discussed in more detail below.

In aspects, generating suggested filter recommendations may be performed by a recommendation engine (e.g., a recommendation engine executing within the environment of templates and rule module 150). The recommendation engine may execute various machine learning algorithms and models, artificial intelligence algorithms and models, statistical analysis models, etc., to generate the suggested filter recommendations for extraction rules. It is noted that in the discussion that follows, two specific techniques for generating suggested filter recommendations are discussed. However, the discussion of the two techniques should not be construed as limiting in any way, as other techniques may also be applied to generate suggested filter recommendations. Additionally, although the discussion herein is focused on suggested filter recommendations, it should be appreciated that other rule modification recommendations may be generated and presented to the user. For example, a rule modification recommendation that includes a suggestion to apply a different search algorithm may be generated and presented to the user. Thus, the discussion herein with respect to suggested filter recommendations should not be construed as limiting in any way.

In aspects, two particular techniques may be used to generate suggested filter recommendations. The two particular techniques involve providing suggested filter recommendations based on data previously identified as relevant to the extraction rule. The data previously identified as relevant to the extraction rule may include positive sentences and/or negative sentences previously identified and/or confirmed by users that may have applied the extraction rule. For example, a user may apply the current revenue extraction rule described in the examples above to an unstructured data input (e.g., one or more input documents) to obtain a set of positive sentence candidates (e.g., sentences that the extraction rule identifies as potentially including the target extraction term (e.g., current revenue)). From the set of positive sentence candidates, the user may select one or more sentences (e.g., manually select the one or more sentences) that the user determines include the target extraction term. The user-selected sentences may be determined to be positive sentences, as these sentences are confirmed by the user as including the target extraction term. In some aspects, the sentences not selected by the user may be determined to be negative sentences as these sentences are not confirmed by the user as including the target extraction term. In some aspects, the user may actively select a sentence not including the target term as a negative sentence. In aspects, the user-selected positive sentences and/or the negative sentences may be stored in the system. As discussed below, the two particular techniques described herein may use the user-selected positive sentences and/or the negative sentences to generate suggested filter recommendations to the user to refine the extraction rule.

In aspects, one of the two particular techniques includes applying a simple statistical model to generate at least one suggested filter recommendation. In aspects, the simple statistical model may include identifying a set of words that are most common (e.g., that occur most often) in the context of positive sentences associated with an extraction rule. For example, given a set of positive sentences associated with an extraction rule, the simple statistical model may determine the words that occur most often in the set of positive sentences. In aspects, the simple statistical model may also include identifying a set of words that are most common (e.g., that occur most often) in the context of negative sentences associated with the extraction rule. For example, given a set of negative sentences associated with the extraction rule, the simple statistical model may determine the words that occur most often in the set of negative sentences. Given the set words that are most common in the set of positive sentences, and given the set words that are most common in the set of negative sentences, the simple statistical model may generate at least one suggested filter recommendation to implement at least one include keyword by identifying words that are significantly common in positive sentences, but not significantly common in negative sentences. Similarly, the simple statistical model may generate at least one suggested filter recommendation to implement at least one exclude keyword by identifying words that are significantly common in negative sentences, but not significantly common in positive sentences. In aspects, the simple statistical model technique may be better suited for situation in which there is not a large set of previous examples of positive and/or negative sentences. For example, in some implementations in which the number of previous examples is between 10 to approximately 100 examples, the simple statistical model technique of embodiments may perform relatively well.

Figure 5:
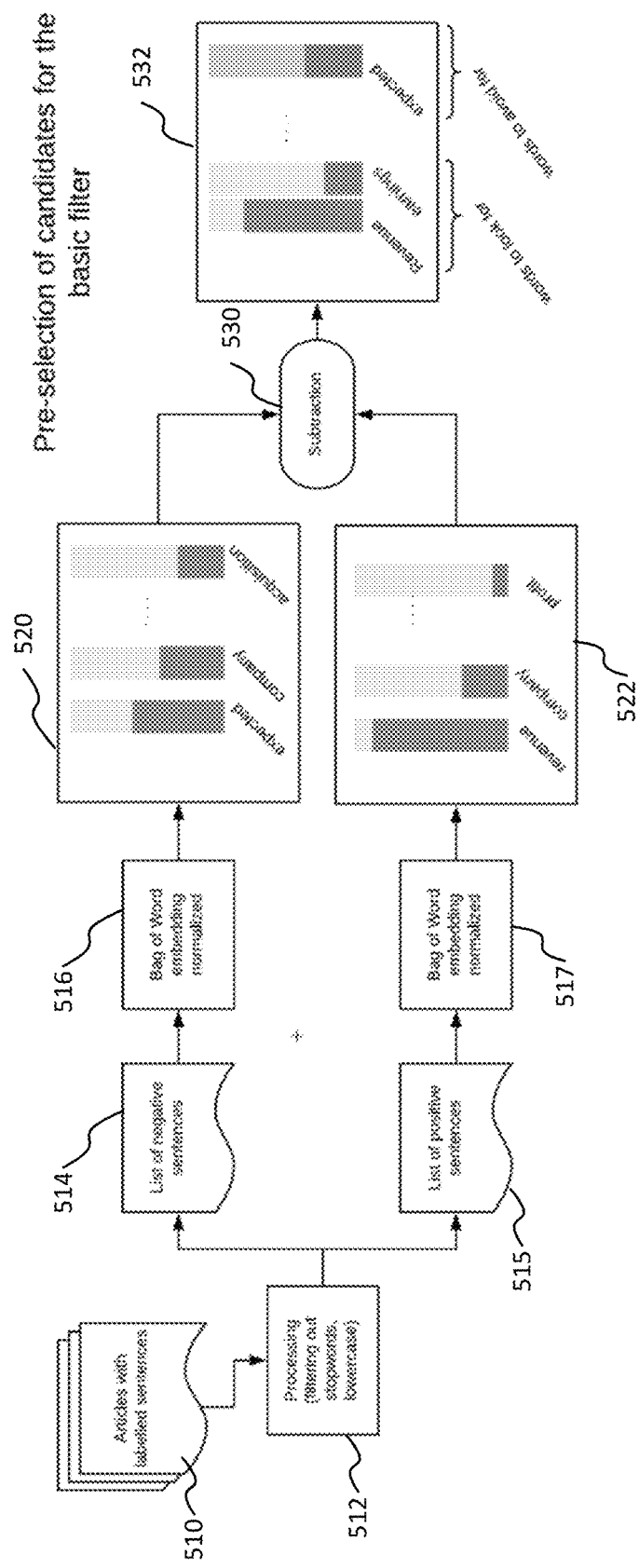
FIG. 5 shows a diagram illustrating a simple statistical model for generating suggested filer recommendations in accordance with embodiments of the disclosure.

The simple statistical model technique is illustrated in the example recommendation engine shown in FIG. 5. FIG. 5 shows a diagram illustrating a simple statistical model for generating suggested filer recommendations in accordance with aspects of the present disclosure. It is noted that the example illustrated in FIG. 5 is shown with respect to an extraction rule with a target extraction term of a current revenue value of a company (e.g., the extraction rule is configured to identify sentences that potentially include the current revenue value of a company). Thus, within the context of the example of FIG. 5, a positive sentence may be a sentence that includes or mentions a current revenue value, and a negative sentence may be a sentence that does not include or excludes a current revenue value. As shown in FIG. 5, a set of labeled sentences 510 may be received by the recommendation engine. In embodiments, the set of labeled sentences 510 may include one or more sentences labeled as positive sentences and/or one or more sentences labeled as negative sentences. At 512, the set of labeled sentences 510 may be processed by filtering out stopwords, lowercase words, etc. From the processed labeled sentences, a set of positive sentences 515 and a set of negative sentences 514 may be obtained. In aspects, the set of positive sentences 515 may include sentences labeled as positive sentences and the set of negative sentences 514 may include sentences labeled as negative sentences.

A set of normalized bag of word embeddings 516 may be generated from the set of negative sentences 514. In aspects, the set of normalized bag of word embeddings 516 may be generated from the set of negative sentences 514 by counting the number of times each word is included in a negative sentence to generate a bag of word embedding for each word. The number of times the word appears in a negative sentence is then normalized (e.g., the number of times the word appears in a negative sentence is divided by the number of times the word appears in the entire set of labeled sentences 510. In this manner, each word that appears in a negative sentence is associated with the number of times the word appears in the set of labeled sentences 510. The result from this operations is a set of words 520, including a normalized count for each word, that appear in negative sentences. In aspects, the set of words 520 that appear in negative sentences may be determined to be exclude keywords candidates, as these words appear in negative sentences and thus, their appearance in a sentence indicates a likelihood that the sentence in which these words appear may be negative sentences. In some aspects, the top N words may be determined to be exclude keywords candidates and the recommendation engine may suggest a filter using those N exclude words. However, in some aspects, as will be noted below, the F-score (e.g., the Fi score) of the suggested filter may be increased by the recommendation engine by considering the appearance of the words in positive sentences.

A set of normalized bag of word embeddings 517 may be generated from the set of positive sentences 515. In aspects, the set of normalized bag of word embeddings 517 may be generated from the set of positive sentences 515 by counting the number of times each word is included in a positive sentence to generate a bag of word embedding for each word. The number of times the word appears in a positive sentence is then normalized (e.g., the number of times the word appears in a positive sentence is divided by the number of times the word appears in the entire set of labeled sentences 510. In this manner, each word that appears in a positive sentence is associated with the number of times the word appears in the set of labeled sentences 510. The result from this operations is a set of words 522, including a normalized count for each word, that appear in positive sentences. In aspects, the set of words 522 that appear in positive sentences may be determined to be include keyword candidates, as these words appear in positive sentences and thus, their appearance in a sentence indicates a likelihood that the sentence in which these words appear may be a positive sentences. In some aspects, the top N words may be determined to be include keywords and the recommendation engine may suggest a filter using those N include keywords. However, in some aspects, as will be noted below, the F-score (e.g., the Fi score) of the suggested filter may be increased by the recommendation engine by considering the appearance of the words in negative sentences.

As mentioned above, the F-score (e.g., the Fi score) of a suggested filter may be increased by considering a count of words in both positive sentences and negative sentences. In other words, some words appear more in positive sentences, some words appear more in negative sentences, and some words appear approximately the same in both positive sentences and negative sentences. Considering this, the recommendation engine of embodiments implements the simple statistical model technique disclosed herein by subtracting, at 530, the count for each word in the set of words 520 that appear in negative sentences from the count for each word in the set of words 522 that appear in positive sentences, and vice versa. The result is a set of words that takes into consideration the appearances of each of those words in both the positive sentences and negative sentences, which is a set of words that are most indicative of positive and negative sentences. For example, set of words 520 that appear in negative sentences may include a high count for the word "expected," indicating that the word "expected" appears a significant number of times in negative sentences. However, set of words 522 that appear in positive sentences may indicate that the word "expected" does not appear in positive sentences at all. As such, when subtraction 530 is applied, the normalized count for the word "expected" in the context of positive sentences (which in this example is 0) is subtracted from the normalized count for the word "expected" in the context of negative sentences (which in this example is a high number) resulting in a determination that the word expected is highly indicative of a negative sentence. As such, the recommendation engine may determine that the word "expected" is a candidate for an exclude keyword and may include the word "expected" in a suggested filter 532 to be recommended to the user for modifying the extraction rule for extracting a current revenue.

In a similar example shown in FIG. 5, set of words 522 that appear in positive sentences may include a high count for the word "revenue," indicating that the word "revenue" appears a significant number of times in positive sentences. However, set of words 520 that appear in negative sentences may indicate that the word "revenue" does not appear in negative sentences at all. As such, when subtraction 530 is applied, the normalized count for the word "revenue" in the context of negative sentences (which in this example is zero) is subtracted from the normalized count for the word "revenue" in the context of positive sentences (which in this example is a high number) resulting in a determination that the word "revenue" is highly indicative of a positive sentence. As such, the recommendation engine may determine that the word "revenue" is a candidate for an exclude keyword and may include the word "revenue" in a suggested filter 532 to be recommended to the user for modifying the extraction rule for extracting a current revenue.

In yet another example shown in FIG. 5, set of words 520 that appear in negative sentences may include a moderate count for the word "company," indicating that the word "company" appears a moderate number of times in negative sentences. Similarly, set of words 522 that appear in positive sentences may indicate that the word "company" also appears a moderate number of times in positive sentences. As such, when subtraction 530 is applied, the normalized count for the word "company" in the context of positive sentences is subtracted from the normalized count for the word "company" in the context of negative sentences resulting in a number close to zero, as both counts are approximately the same, resulting in a determination that the word "company" is not significantly indicative of either a negative sentence or a positive sentence. As such, the recommendation engine may determine that the word "company" is not a candidate for either an exclude keyword or an include keyword in a suggested filter to be recommended to the user.

In some aspects, whether a word is indicative of a positive or negative sentence may be determined when the normalized count of the word, after subtraction at 530, is higher than a predetermined threshold. In this case, the word, whether a word in set of words 520 or 522, may be determined to be indicative of a negative or positive sentence, respectively, and may be recommended as a suggested filter by the recommendation engine.

As shown in FIG. 5, suggested filter 532 may recommended by the recommendation engine. In aspects, suggested filter 532 may include at least suggesting the word "revenue" as an include keyword, and/or the word "expected" as an exclude keyword.

In aspects, another one of the two particular techniques for generating suggested filter recommendations includes extracting Boolean expressions from a decision tree. In aspects, a decision tree may be trained with the data previously identified as relevant to the extraction rule to classify sentences as either positive or negative sentences with respect to the extraction rule. For example, positive sentences and/or negative sentences previously identified by users may be stored, and then retrieved to train the decision tree (e.g., a random forest classifier) to classify the sentences with respect to the extraction rule. The trained decision tree may be applied to the input document(s) and may generate branches or paths representing classification of sentences of the documents based on the relevancy of various words with respect to the classification. In aspects, the paths of the decision tree may be extracted and converted into a Boolean expression that may be presented to the user as a suggested filter recommendation for refining the extraction rule. In aspects, the decision tree technique may be better suited for situation in which there is a significant set of previous examples of positive and/or negative sentences. For example, in some implementations in which the number of previous examples is higher than 100 examples, the decision tree technique of embodiments may perform relatively well, especially as compared with the simple statistical model technique described above.

It is noted that the decision tree technique discussed herein provides some benefits over the simple statistical model described above. For example, suggested filter recommendations provided by the decision tree technique may include multiple keywords as suggested filter keywords, which may allow a user to reduce the number of times an extraction rule is edited. Additionally, suggested filter recommendations provided by the decision tree technique may represent a Boolean combination of target search terms, or keywords, that may provide a direct improvement to the current extraction rule that a single term search may miss. For example, an extraction rule configured to identify sentences that mention a current revenue of a company may include the group of include keywords INCLUDE('revenue'). In aspects, modifying the include keywords group to INCLUDE('revenue', 'sales') may result in additional true positive sentences being identified as positive sentence candidates by the extraction rule, but may also result in additional noise in the form of true negative sentences mistakenly identified as positive sentence candidates (e.g., sentences that mention 'store sales' or 'food segment sales' figures, which are not actually current revenue values but use some of the keywords in the include keywords group). In aspects, the decision tree technique may enable suggestion that may improve the extraction by suggesting a modification to INCLUDE('revenue', 'sales') AND EXCLUDE ('store', 'food'), which may yield more "true positive sentences" while not increasing the number of "true negative sentences" mistakenly identified as positive sentence candidates.

Figure 6:
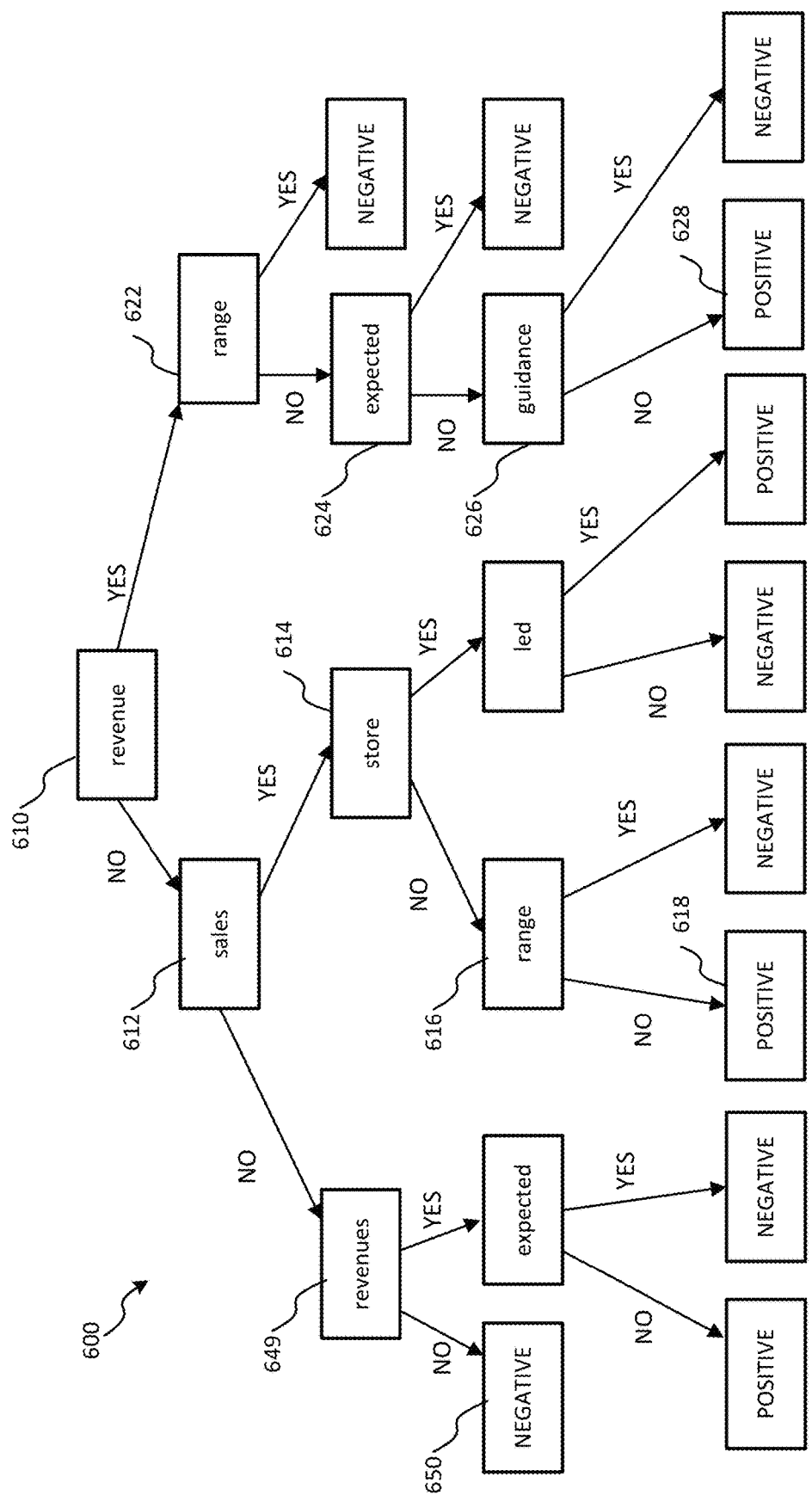
FIG. 6 shows a diagram illustrating a decision tree model for generating suggested filer recommendations in accordance with embodiments of the disclosure.

The decision tree technique is illustrated in the example recommendation engine shown in FIG. 6. FIG. 6 shows a diagram illustrating a decision tree model for generating suggested filer recommendations in accordance with aspects of the present disclosure. It is noted that the example illustrated in FIG. 6 is shown with respect to an extraction rule with a target extraction term of a current revenue value (e.g., an extraction rule that is configured to identify sentences that mention a current revenue value). Thus, within the context of the example of FIG. 6, a positive sentence may be a sentence that includes or mentions a current revenue, and a negative sentence may be a sentence that does not include or excludes a current revenue. In aspects, the decision tree may be applied to sentences to determine and/or to identify whether a sentence is a positive sentence candidate or a negative sentence candidate. A path in the decision tree may lead to a positive sentence candidate or a negative sentence candidate. In aspects, the decision tree may be applied to sentences to determine and/or to identify whether a sentence is a positive sentence candidate or a negative sentence candidate. A path leading to a positive leaf (e.g. which may indicate that a sentence based on which the path was generated is a positive sentence) from the root of the tree may be extracted as a Boolean expression for identifying positive sentences. For example, sentences may land on a positive or negative leaf. When a sentence lands on a positive leaf (e.g., indicating that the sentence is a positive sentence candidate), the path of the positive leaf to the root of the tree may be extracted as a Boolean expression for identifying positive sentence candidate. In aspects, the Boolean expression may be formed by extracting the nodes in the path of the positive leaf to the root of the tree and adding the nodes in a positive conjunction fashion. Similarly, a path leading to a negative leaf (e.g., indicating negative sentence candidate criteria), the path of the negative leaf to the root of the tree may be extracted as a Boolean expression for identifying negative sentence candidate. In aspects, the Boolean expression may be formed by extracting the nodes in the path of the negative leaf to the root of the tree and adding the nodes in a negative conjunction fashion. In aspects, the Boolean expressions may then be normalized and formatted in a standardized extraction rule format, and suggested as a filter recommendation.

FIG. 6 shows decision tree 600. In aspects, decision tree 600 may be configured to generate Boolean expression that may identify sentences that include mentions of a current revenue. In aspects, decision tree 600 may be trained using a set of sample sentences previously identified as positive sentences and/or negative sentences (e.g., with respect to the target extraction term of current revenue). These sample sentences may be included in a set of user annotations. In aspects, statistical estimations may be applied to the sentences to determine at least one word that may best indicate whether a sentence is a negative sentence or a positive sentence. In this manner, the statistical estimation may be used to separate positive sentences from negative sentences. In this example, sentences that do not include the word 'revenue' may be identified as negative sentences and sentences that include the word 'revenue' may be identified as positive sentences. In this example, the word "revenue" is a suitable candidate for the root node of the decision tree. The decision tree is then grown from the set of sample sentences, and each node of a leaf path represents a word that provides a further criteria for distinguishing a typical positive sentence from a typical negative sentence. For example, at each node of a path from a positive leaf (e.g., a leaf indicating a positive sentence) to the root of the tree, the associated word of the node is a word that contributes to the criteria distinguishing the positive sentence from negative sentences or even other positive sentences. Similarly, at each node of a path from a negative leaf (e.g., a leaf indicating a negative sentence) to the root of the tree, the associated word of the node is a word that contributes to the criteria distinguishing the negative sentence from positive sentences, or even other negative sentences.

For example, as shown in FIG. 6, a sentence landing at positive leaf 628 may be classified as a positive sentence candidate (e.g., a sentence potentially or likely mentioning a current revenue). As scan be seen, the path from positive leaf 628 to the root node 610 includes nodes 626, 624, and 622. In aspects, classifying the sentence as a positive sentence candidate (terminating at leaf 628) includes determining, at node 610, that the sentence includes the keyword "revenue," and then proceeding to node 622. At node 622, a determination as to whether the word "range" is present in the sentence is made. It will be appreciated that, absence of the word "range" from the sentence contributes to labelling the sentience as a positive sentence candidate. In this case, the word range may be absent from the sentence and the process flows to node 624, where a determination as to whether the word "expected" is present in the sentence is made. If the word "expected" is not present in the sentence, the process flows to node 626, where a determination as to whether the word "guidance" is present in the sentence is made. As the word "guidance is not present in the sentence, the process flows to positive leaf 628, which indicates that the sentence is a positive sentence candidate.

In aspects, of the present disclosure, the nodes of the path from the root node 610 to the positive leaf path 628 may be extracted as a Boolean expression, where the keyword associated with each of the nodes may be used to help distinguish a sentence as a positive sentence candidate, since the sentence has been determined to be a positive sentence candidate by the decision tree. In aspects, generating the suggested filter recommendations may include extracting the positive leaf path of the decision tree and converting it into a Boolean expression. For example, the nodes of the path discussed above (e.g., nodes 610, 622, 624, and 626) may be extracted and then added in a positive conjunction manner. For example, since the words "range," "expected," and "guidance" at nodes 622, 624, and 626, respectively, are not found in the identified positive sentence candidate, in this case, the words "range," "expected," and "guidance" are each added as a NOT to the expression. However, since the word "revenue" at node 610 is found in the positive sentence candidate, the word "revenue" is added to the Boolean expression. In this example, the Boolean expression may be extracted as <["revenue"] AND [NOT ("range")] AND [NOT ("expected")] AND [NOT ("guidance")]>. In aspects, the Boolean expression may be normalized and converted in a standardized format (e.g., using INCLUDE and EXCLUDE format) to be compatible with a rule definition language. For example, the above Boolean expression may be converted to INCLUDE ('revenue') AND EXCLUDE ('range', 'expected', 'guidance') to identify positive sentences. This expression may be recommended as a filter suggestion to the user.

In another example illustrated in FIG. 6, a sentence landing at negative leaf 650 may be classified as a negative sentence candidate (e.g., a sentence likely not mentioning a current revenue). As scan be seen, the path from negative leaf 650 to the root node 610 includes nodes 649 and 612. In aspects, classifying the sentence as a negative sentence candidate (terminating at leaf 650) includes determining, at node 610, that the sentence does not include the keyword "revenue," and then proceeding to node 612. At node 612, a determination as to whether the word "sales" is present in the sentence is made. In this case, the word "sales" may be absent from the sentence and the process flows to node 649, where a determination as to whether the word "revenues" is present in the sentence is made. If the word "revenue" is not present in the sentence, the process flows to negative leaf 650, which indicates that the sentence is a negative sentence candidate.

In aspects, of the present disclosure, the nodes of the path from the root node 610 to the negative leaf path 650 may be extracted as a Boolean expression, where the keyword associated with each of the nodes may be used to help distinguish a sentence as a negative sentence candidate with respect to the target extraction term, since the sentence has been determined to be a negative sentence candidate by the decision tree. In aspects, generating the suggested filter recommendations may include extracting the negative leaf path of the decision tree and converting it into a Boolean expression. For example, the nodes of the path discussed above (e.g., nodes 610, 612, and 649) may be extracted and then added in a negative conjunction manner. For example, "revenues" and "sales at nodes 649 and 612, respectively, are not found in a positive sentence candidate, in this case, each of the word "revenues" and" sales are added as a NOT to the expression. However, since the word "revenue" at node 610 is found in the positive sentence candidate, the word "revenue" is added to the Boolean expression. The expression is constructed as a negative conjunction since the sentence has been identified as a negative sentence candidate at the leaf, rather than as a positive sentence candidate, and so a NOT is added to the full expression. In this example, the Boolean expression may be extracted as <NOT ([NOT ("revenue")] AND [NOT("sales")] AND [NOT("revenues")])>, which is logically equivalent to <[("revenue")] OR [("sales")] OR [("revenues")]>. As such, this Boolean expression may be used to identify negative sentence candidates. In aspects, the Boolean expression may be normalized and converted in a standardized format (e.g., using INCLUDE and EXCLUDE format) to be compatible with a rule definition language. For example, the above Boolean expression may be converted to INCLUDE ('revenue', 'sales', 'revenues') to identify negative sentence candidates. This expression may be recommended as a filter suggestion to the user.

In another example path terminating at positive leaf 618, a sentence may be identified a positive sentence candidate. At node 610, it may be determined that the word "revenue" is not present in the sentence, but at 612 it may be determined that the word "sales" is present in the sentence. In this path, at 614 and at 616, it may be determined that the words "store" and "range", respectively, may not be present in the sentence. At 618, the path ends with determination that the sentence is a positive sentence candidate. In this case, generating the suggested filter recommendations may include extracting this path of the decision tree and converting it into a Boolean expression, normalizing, and converting it into a rule format. For example, the path herein discussed may be converted in the following expression: INCLUDE ('sales') AND EXCLUDE ('revenue', 'store', 'range'). This Boolean expression may be recommended as a filter suggestion to the user.

In aspects, if the user accepts any or all the suggested filter recommendations, the extraction rule configured to extract a current revenue may be refined based on the selected recommendations. For example, where the user selects the suggested filter "INCLUDE ('revenue') AND EXCLUDE ('range', 'expected', 'guidance')," a sentence may be determined to be a positive sentence candidate with respect to the extraction rule when the sentence includes the term "revenue" but does not include the words "range," "expected," and "guidance." Without this filter, the extraction rule may generate a large number of false positives, as noted above. In aspects, selecting the suggested filter recommendation may include the user modifying an existing rule (e.g., INCLUDE ('revenue'), to include the suggested additional include and/or exclude keywords (e.g., add EXCLUDE ('range', 'expected', 'guidance')) or a subset therefrom.

It will be appreciated that any of the paths of the decision tree may be extracted as Boolean expressions that may be used as filters in an extraction rule. The discussion above has focused on two particular paths, but this is made for illustrative purposes and not by way of limitation.

In aspects, the simple statistical technique described above and the decision tree technique may be combined. For example, a user may use an extraction rule that includes INCLUDE ('revenue') to identify positive sentence candidates. In aspects, the user may confirm a number positive sentence candidates, but there may be a large number of false positives and false negatives. In aspects, a simple statistical model may be used to provide a filter recommendation to the user that includes recommending the addition of the words "sales" and "million" as INCLUDE keywords. In this case, the user may confirm to add the word sales, but ignore the word million, and so the extraction rule may be modified to INCLUDE('revenue', 'sales'). In some aspects, a decision tree may be used to provide further filter recommendation to the user that includes recommending the addition of the words "range", "expected", and "guidance" as EXCLUDE keywords. In this case, the user may confirm to add all the recommended exclude keywords, and so the extraction rule may be further modified to INCLUDE('revenue', 'sales') AND EXCLUDE('range', 'expected', 'guidance').

In aspects, when the extraction rule is applied to input document(s) and positive sentence candidates are identified and presented to the user for selection, the user may select one or more of the positive sentence candidates and confirm that these positive sentence candidates are positive sentences (e.g., sentences including the target extraction term). In aspects, the user may select a target extraction term from a list of suggested target extraction term within the input documents, and not sentences. For example, the target extraction terms may be structured values for a type specified in a rule (e.g., MONEY for revenue values, DATE for date of birth, etc.) that may be contained in a sentence that passes the Boolean filter expression (e.g., a positive sentence candidate). For example, sentences within a document may state "Total revenue for the first quarter went up by $10M to $200M. Store sales were $30M for the quarter. CEO Smith said he was very happy about the increase in revenue. Operational expenses totaled $50M.". In aspects, an extraction rule defined to extract MONEY with a Boolean filter of <INCLUDE('sales', 'revenue')> (for current revenue value), may result in identification of the sentence text snippets containing $10M, $200M, and $30M as positive sentence candidates. In aspects, the third sentence may pass the Boolean filter but no potential target extraction terms may be flagged because the sentence does not contain a money value. On the other hand, the fourth sentence may not pass the Boolean filter and thus $50M may not be included in the potential extraction target set. In aspects, the user may review the positive sentence candidates and may select $200M as the correct target extraction term. In aspects, the user selection may be stored and the first sentence may be identified as a positive sentence for 'total revenue value' extraction while all other sentences may be identified as negative sentences. $10M may be flagged as a negative extraction example that is contained in a positive sentence. Although in some cases a distinction between $10M and $200M may not be made as multiple money values may not be distinguished in a given rule-matching sentence, a "text sequence pattern" may be added to the pattern matching part of the extraction rule definition to consider this situation. In some aspects, the user-selected positive sentences may be stored and/or fed back to the decision tree to further refine the tree based on the user's selection. In this manner, the decision tree is constantly and dynamically learning from usage, such that the more it is used, the more precise the paths become.

Figure 7:
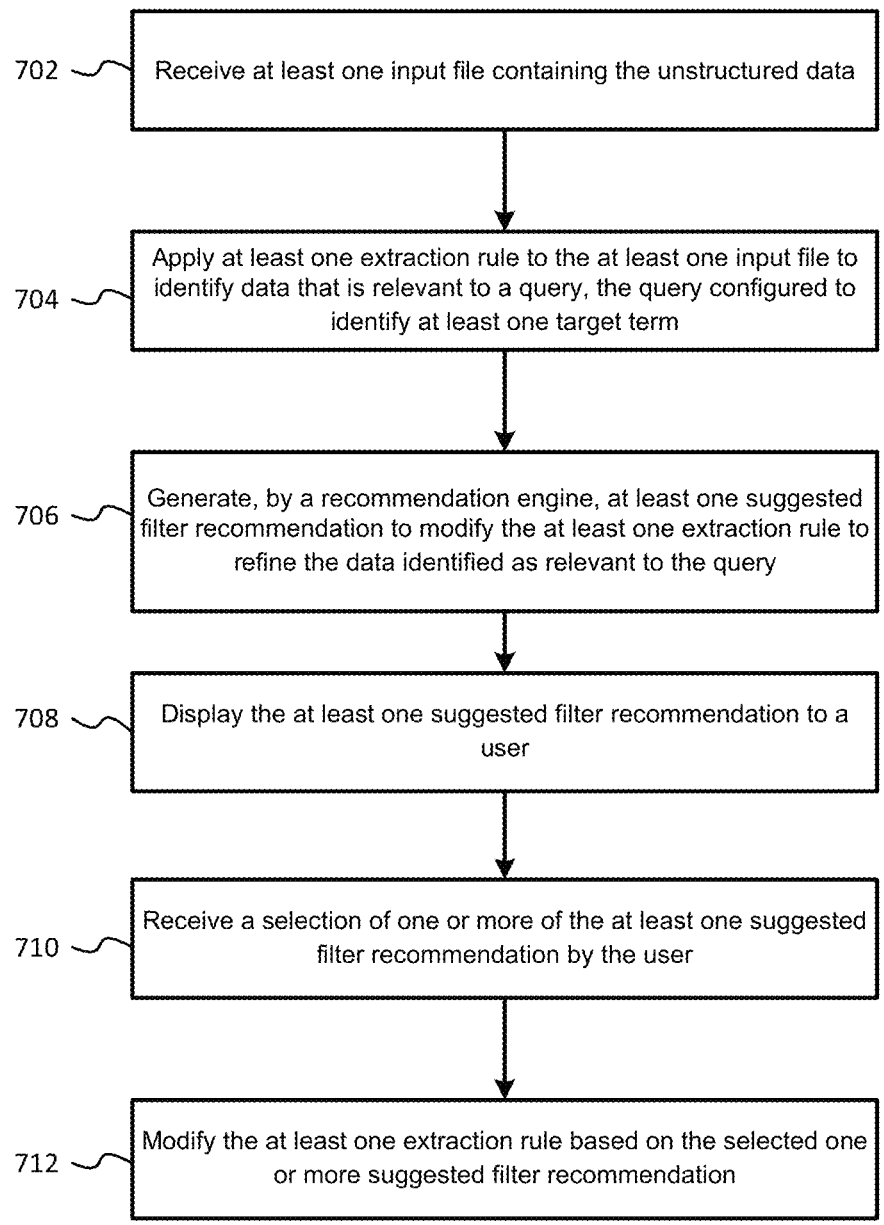
FIG. 7 shows a functional block diagram illustrating an example flow executed to implement aspects of the present disclosure.

FIG. 7 shows a functional block diagram illustrating an example flow executed to implement aspects of the present disclosure. In particular, FIG. 7 illustrates a method of refining an extraction rule in accordance with aspects of the present disclosure. At block 702, at least one input file containing the unstructured data is received. For example, an input file or documents may be received by a server (e.g., server 102 of FIG. 1, and/or a recommendation engine executed in server 102). At block 704, at least one extraction rule is applied to the at least one input file to identify data that is relevant to a query. In embodiments, the query may be configured to identify at least one target term.

At block 706, a recommendation engine may generate at least one suggested filter recommendation to modify the at least one extraction rule to refine the data identified as relevant to the query. In aspects, generating the at least one suggested filter recommendation may include generating, by the recommendation engine, the at least one suggested filter recommendation based at least in part on data previously identified as relevant to the query. For example, the data previously identified as relevant to the query may include one or more positive sentences and one or more negative sentences. In aspects, the one or more positive sentences may include the at least one target term, and the one or more negative sentences may not include or exclude the at least one target term.

In embodiments, generating the at least one suggested filter recommendation may include identifying a set of include candidate words that occur most often in each of the one or more positive sentences, and identifying a set of exclude candidate words that occur most often in the one or more negative sentences. In aspects, the set of include candidate words may include a count of each occurrence in the one or more positive sentences of each include candidate word in the set of include candidate words, and the set of exclude candidate words may include a count of each occurrence in the one or more negative sentences of each exclude candidate word in the set of exclude candidate words.

In embodiments, a set of include words may be determined. Determining the set of include words may include subtracting the count of each occurrence in the one or more negative sentences of each exclude candidate word in the set of exclude candidate words from the count of each occurrence in the one or more positive sentences of a corresponding include candidate word to generate the set of include words. In aspects, an exclude candidate word may be the same as the corresponding include candidate word. In some embodiments, determining the set of include words may also include including candidate words with a corresponding positive occurrence count after the subtracting in the set of include words.

In embodiments, a set of exclude words may be determined. Determining the set of exclude words may include subtracting the count of each occurrence in the one or more positive sentences of each include candidate word in the set of include candidate words from the count of each occurrence in the one or more negative sentences of a corresponding exclude candidate word in the set of exclude candidate words to generate the set of exclude words. In aspects, an include candidate word may be the same as the corresponding exclude candidate word. In some embodiments, determining the set of exclude words may also include including exclude candidate words with a positive occurrence count after the subtracting in the set of exclude words.

In embodiments, the suggested filter recommendations may include modifying the at least one extraction rule to include at least one word in the set of include words as an include word, such that the at least one extraction rule is configured to identify a sentence as a positive sentence when the sentence includes the include word. In embodiments, the suggested filter recommendations may additionally or alternatively include modifying the at least one extraction rule to include at least one word in the in the set of exclude words as an exclude word, such that the at least one extraction rule is configured to identify a sentence as a positive sentence when the sentence excludes the exclude word.

In embodiments, generating the at least one suggested filter recommendation may include extracting at least one path of a decision tree configured to classify a sentence as a positive sentence or a negative sentence, converting the extracted at least one path into at least one Boolean expression, and presenting the at least one Boolean expression as the at least one suggested filter recommendation to the user.

In aspects, the decision tree may be trained using the one or more positive sentences and the one or more negative sentences in the data previously identified as relevant to the query.

In embodiments, each path of the decision tree may include at least one include candidate word representing a word with a high likelihood to appear in a positive sentence, and/or at least one exclude candidate word representing a word with a high likelihood to appear in a negative sentence.

In embodiments, the suggested filter recommendations may include modifying the at least one extraction rule to include the at least one include candidate word as an include word in the at least one extraction rule such that the at least one extraction rule is configured to identify a sentence as a positive sentence when the sentence includes the include word. In embodiments, the suggested filter recommendations may additionally or alternatively include modifying the at least one extraction rule to include the at least one exclude candidate word as an exclude word such that the at least one extraction rule is configured to identify a sentence as a positive sentence when the sentence excludes the exclude word.

At block 708, the at least one suggested filter recommendation is displayed to a user, and at block 710, a selection of one or more of the at least one suggested filter recommendation by the user may be received. In embodiments, the user-selected filter may be stored and/or fed back to the recommendation engine to refine the suggested filter recommendation process.

At block 712, the at least one extraction rule is modified based on the selected one or more suggested filter recommendations. For example, an extraction rule may be modified to include a user-selected filter of the suggested filters recommended by the recommendation engine. In that manner, the extraction rule may take into account the include and/or exclude words in the suggested filter when extracting data associated with the rule (e.g., when searching for and/or extracting the target term). In aspects, the results of the modified extraction rule may be more precise than the result of the unmodified extraction rule. For example, applying the unmodified extraction rule to the input data may result in a first number of identified positive sentence candidates, but applying the modified extraction rule to the input data may result in a second number of identified positive sentence candidates that is less than the first number. In aspects, this is because the modified rule is more precise and includes less false positive and/or less false negatives. As such, the application of the automated features of the recommendation engine enhances the manual operations of the user with respect to searching for, finding, and extracting a target terms using extraction rules.

It is noted than in some embodiments, the modification of the extraction rule based on at least one suggested filter recommendation may be performed automatically, without a user selecting one or more of the suggested filter recommendations. In these embodiments, one or more of the suggested filter recommendations may be automatically implemented into an extraction rule, thereby automatically modifying the extraction rule based on the suggested filter recommendations without user intervention.

Referring back to FIG. 3, at block 314, the structured output report is generated using the collected information from the selected template. In aspects, the fields and sections of the selected template correspond to fields and sections of the structured output report. As such, the fields and sections of the structured output report may be populated using the collected information for each of the fields and sections of the selected template. The collected information for each of the fields and sections of the selected template is structured representation of the information from the unstructured source documents. The generation of the structured output report may be accomplished using functionality in accordance with the functionality of content annotator and output generator 160 of FIG. 1. In some aspects, the structured output report may be a case plan and/or cases management information.

In aspects, mechanisms for distinguishing and filtering target extraction terms from within a positive sentence candidate may be provided. In these cases, rather than identifying all MONEY/DATE/NUMBER values from all of sentences that match a Boolean expression sentence filter, multiple items within a given sentence may be distinguished through the expression of a text sequence pattern. For example, the sentence "Quarterly revenue increased by $10M to $200M" may match a Boolean expression filter for current revenue. In aspects, the filter may be adjusted to only include both or neither of the money values. In this example, only $200M is the correct value. The addition of a sequence pattern (e.g., ["to", "was", "is", "totals"]<MONEY>) may allow narrowing the results to only one potential extraction target.

In aspects, a graphical user interface (GUI) may be provided for reviewing errors and quality of a current rules implementation. This GUI may also facilitate editing extraction rules, and the review and confirming filter suggestions.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1 and 3 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a cloud storage facility, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of refining an extraction rule, the method comprising:
   receiving at least one input file containing unstructured data;
   applying at least one extraction rule to the at least one input file to identify data that is relevant to a query, the query configured to identify at least one target term;
   generating, by a recommendation engine, at least one suggested filter recommendation to modify the at least one extraction rule to refine the data identified as relevant to the query, based on at least one path of a decision tree trained with data previously identified as relevant to the query,
      wherein the data previously identified as relevant to the query includes one or more positive sentences and one or more negative sentences,
      wherein the one or more positive sentences include the at least one target term,
      wherein the one or more negative sentences exclude the at least one target term, and
      wherein generating the at least one suggested filter recommendation includes:
         extracting the at least one path of the decision tree; and
         converting the extracted at least one path into at least one Boolean expression;
   displaying the at least one Boolean expression as the at least one suggested filter recommendation to a user;
   receiving a selection of one or more of the at least one suggested filter recommendation by the user; and
   modifying the at least one extraction rule based on the selected one or more suggested filter recommendation.

2. The method of claim 1, wherein the decision tree is trained to classify sentences based on a relevancy of words in each sentence with respect to the query.

3. The method of claim 1, wherein generating the at least one suggested filter recommendation includes:
   identifying a set of include candidate words that occur most often in each of the one or more positive sentences, the set of include candidate words including a count of each occurrence in the one or more positive sentences of each include candidate word in the set of include candidate words; and
   identifying a set of exclude candidate words that occur most often in the one or more negative sentences, the set of exclude candidate words including a count of each occurrence in the one or more negative sentences of each exclude candidate word in the set of exclude candidate words.

4. The method of claim 3, further comprising:
   determining a set of include words by:
      subtracting the count of each occurrence in the one or more negative sentences of each exclude candidate word in the set of exclude candidate words from the count of each occurrence in the one or more positive sentences of a corresponding include candidate word in the set of include candidate words to generate the set of include words, an exclude candidate word being the same as the corresponding include candidate word; and
      including include candidate words with a corresponding positive occurrence count after the subtracting in the set of include words;

determining a set of exclude words by:
  subtracting the count of each occurrence in the one or more positive sentences of each include candidate word in the set of include candidate words from the count of each occurrence in the one or more negative sentences of a corresponding exclude candidate word in the set of exclude candidate words to generate the set of exclude words, an include candidate word being the same as the corresponding exclude candidate word; and
  including exclude candidate words with a positive occurrence count after the subtracting in the set of exclude words.

5. The method of claim 4, further comprising:
ranking each word in the set of include words based on the corresponding positive occurrence, wherein a word with a highest positive occurrence count is ranked highest; and
ranking each word in the set of exclude words based on the corresponding positive occurrence, wherein a word with a highest positive occurrence count is ranked highest.

6. The method of claim 5, wherein the at least one suggested filter recommendation includes one or more of:
including at least one word in the set of include words as an include word, such that the at least one extraction rule is configured to identify a sentence as a positive sentence when the sentence includes the include word; and
including at least one word in the set of exclude words as an exclude word, such that the at least one extraction rule is configured to identify a sentence as a negative sentence when the sentence includes the exclude word.

7. The method of claim 1, further comprising:
training the decision tree using the one or more positive sentences and the one or more negative sentences in the data previously identified as relevant to the query.

8. The method of claim 7, wherein each path of the decision tree includes one or more of:
at least one include candidate word representing a word with a high likelihood to appear in a positive sentence; and
at least one exclude candidate word representing a word with a high likelihood to appear in a negative sentence.

9. The method of claim 8, wherein the at least one suggested filter recommendation includes one or more of:
the at least one include candidate word as an include word in the at least one extraction rule such that the at least one extraction rule is configured to identify a sentence as a positive sentence when the sentence includes the include word; and
the at least one exclude candidate word as an exclude word such that the at least one extraction rule is configured to identify a sentence as a positive sentence when the sentence excludes the exclude word.

10. The method of claim 1, further comprising:
receiving a selection of the at least one target term from the data identified as relevant to the query by the modified at least one extraction rule; and
updating the decision tree based on the selection of the at least one target term by the user.

11. The method of claim 1, wherein the at least one target term is a target of the query and includes one or more of: a value, a word, and a combination thereof.

12. A system for refining an extraction rule, comprising:
at least one unstructured document source;
a server configured to:
  receive at least one unstructured document;
  apply at least one extraction rule to the at least one unstructured document to identify data that is relevant to a query, the query configured to identify at least one target term;
  generate, using a recommendation engine, at least one suggested filter recommendation to modify the at least one extraction rule to refine the data identified as relevant to the query, based on at least one path of a decision tree trained with data previously identified as relevant to the query,
    wherein the data previously identified as relevant to the query includes one or more positive sentences and one or more negative sentences,
    wherein the one or more positive sentences include the at least one target term,
    wherein the one or more negative sentences exclude the at least one target term, and
    wherein generating the at least one suggested filter recommendation includes:
      extracting the at least one path of the decision tree; and
      converting the extracted at least one path into at least one Boolean expression;
  display the at least one Boolean expression as the at least one suggested filter recommendation to a user;
  receive a selection of one or more of the at least one suggested filter recommendation by the user; and
  modify the at least one extraction rule based on the selected one or more suggested filter recommendation.

13. The system of claim 12, wherein the decision tree is trained to classify sentences based on a relevancy of words in each sentence with respect to the query.

14. The system of claim 12, wherein the configuration of the server to generate the at least one suggested filter recommendation includes configuration of the server to:
identify a set of include candidate words that occur most often in each of the one or more positive sentences, the set of include candidate words including a count of each occurrence in the one or more positive sentences of each include candidate word in the set of include candidate words; and
identify a set of exclude candidate words that occur most often in the one or more negative sentences, the set of exclude candidate words including a count of each occurrence in the one or more negative sentences of each exclude candidate word in the set of exclude candidate words.

15. The system of claim 12, wherein the decision tree configured to classify a sentence as a positive sentence or a negative sentence, and wherein the server is configured to generate the at least one suggested filter recommendation by:
extracting the at least one path of the decision tree;
converting the extracted at least one path into at least one Boolean expression; and
presenting the at least one Boolean expression as the at least one suggested filter recommendation to the user.

16. The system of claim 15, wherein each path of the decision tree includes one or more of:
at least one include candidate word representing a word with a high likelihood to appear in a positive sentence; and at least one exclude candidate word representing a word with a high likelihood to appear in a negative sentence.

17. A computer-based tool for refining an extraction rule, the computer-based tool including non-transitory computer readable media having stored thereon computer code which, when executed by a processor, causes a computing device to perform operations comprising:

receiving at least one input file containing unstructured data;

applying at least one extraction rule to the at least one input file to identify data that is relevant to a query, the query configured to identify at least one target term;

generating, by a recommendation engine, at least one suggested filter recommendation to modify the at least one extraction rule to refine the data identified as relevant to the query, based on at least one path of a decision tree trained with data previously identified as relevant to the query, wherein the data previously identified as relevant to the query includes one or more positive sentences and one or more negative sentences, wherein the one or more positive sentences include the at least one target term, wherein the one or more negative sentences exclude the at least one target term, and wherein generating the at least one suggested filter recommendation includes:

extracting the at least one path of the decision tree; and converting the extracted at least one path into at least one Boolean expression;

displaying the at least one Boolean expression as the at least one suggested filter recommendation to a user;

receiving a selection of one or more of the at least one suggested filter recommendation by the user; and modifying the at least one extraction rule based on the selected one or more suggested filter recommendation.

* * * * *

UNITED STATES PATENT AND TRADEMARK OFFICE
CERTIFICATE OF CORRECTION

| | |
|---|---|
| PATENT NO. | : 12,182,186 B2 |
| APPLICATION NO. | : 17/233249 |
| DATED | : December 31, 2024 |
| INVENTOR(S) | : Hella-Franziska Hoffmann et al. |

Page 1 of 1

It is certified that error appears in the above-identified patent and that said Letters Patent is hereby corrected as shown below:

In the Specification

At Column 22, Line number 65, delete "Fi" and replace with --$F_1$--.
At Column 23, Line number 25, delete "Fi" and replace with --$F_1$--.
At Column 23, Line number 28, delete "Fi" and replace with --$F_1$--.

Signed and Sealed this
Fourth Day of February, 2025

Coke Morgan Stewart
*Acting Director of the United States Patent and Trademark Office*